(12) United States Patent
Miller et al.

(10) Patent No.: US 8,328,906 B2
(45) Date of Patent: *Dec. 11, 2012

(54) METHOD OF MAKING A CROSSLINKED FIBER MEMBRANE FROM A HIGH MOLECULAR WEIGHT, MONOESTERIFIED POLYIMIDE POLYMER

(75) Inventors: Stephen J. Miller, San Ramon, CA (US); Imona C. Omole, Atlanta, GA (US); William J. Kronos, Atlanta, GA (US)

(73) Assignees: Chevron U.S.A. Inc., San Ramon, CA (US); Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,350

(22) Filed: Nov. 28, 2011

(65) Prior Publication Data
US 2012/0067208 A1 Mar. 22, 2012

Related U.S. Application Data

(63) Continuation of application No. 12/007,467, filed on Jan. 10, 2008, now Pat. No. 8,066,799.

(51) Int. Cl.
*B01D 53/22* (2006.01)
*B01D 71/40* (2006.01)
*B01D 71/64* (2006.01)
*C08G 73/10* (2006.01)

(52) U.S. Cl. ............... 95/45; 95/47; 95/51; 95/54; 96/4; 96/8; 96/9; 96/10; 96/11; 96/13; 96/14; 210/640; 210/500.27; 210/506; 525/420; 525/422; 525/423; 524/538; 524/599

(58) Field of Classification Search ............... 95/45, 47, 95/51, 54; 96/4, 7, 8, 9, 10, 11, 12, 13, 14; 55/524, DIG. 5; 210/640, 650, 500.27, 500.37, 210/506; 525/420, 422, 423, 436; 524/538, 524/599; 264/210.1, 203, 209.1
See application file for complete search history.

(56) References Cited

U.S. PATENT DOCUMENTS

| 4,654,415 A | 3/1987 | Ahne et al. |
| 4,728,345 A | 3/1988 | Murphy |
| 4,808,686 A * | 2/1989 | Cella et al. ............ 528/27 |

(Continued)

OTHER PUBLICATIONS

Wallace, D., "Crosslinked Hollow Fiber Membranes for Natural Gas Purification and their Manufacture from Novel Polymers", Ph.D. Disseration, University of Texas, Aug. 2004.*

(Continued)

*Primary Examiner* — Jason M Greene
(74) *Attorney, Agent, or Firm* — Merchant & Gould

(57) ABSTRACT

The present disclosure relates to a high molecular weight, monoesterified polyimide polymer. Such high molecular weight, monoesterified polyimide polymers are useful in forming crosslinked polymer membranes for the separation of fluid mixtures. According to its broadest aspect, the method of making a crosslinked membrane comprises the following steps: (a) preparing a polyimide polymer comprising carboxylic acid functional groups from a reaction solution comprising monomers and at least one solvent; (b) treating the polyimide polymer with a diol at esterification conditions in the presence of dehydrating conditions to form a monoesterified polyimide polymer; and (c) subjecting the monoesterified fiber to transesterification conditions to form a crosslinked fiber membrane, wherein the dehydrating conditions at least partially remove water produced during step (b). The crosslinked membranes can be used to separate at least one component from a feed stream including more than one component.

31 Claims, 10 Drawing Sheets

Monoesterification and Transesterifcation Reactions

U.S. PATENT DOCUMENTS

| | | | |
|---|---|---|---|
| 5,085,676 | A | 2/1992 | Ekiner et al. |
| 5,104,532 | A | 4/1992 | Thompson et al. |
| 5,288,304 | A | 2/1994 | Koros et al. |
| 6,184,333 | B1 * | 2/2001 | Gray .............. 525/420 |
| 6,527,987 | B1 * | 3/2003 | Yabuki et al. .......... 264/28 |
| 6,755,900 | B2 | 6/2004 | Koros et al. |
| 6,897,921 | B2 * | 5/2005 | Furukawa et al. ........ 349/113 |
| 6,932,859 | B2 | 8/2005 | Koros et al. |
| 7,101,619 | B2 | 9/2006 | Nishinaka et al. |
| 7,115,681 | B2 | 10/2006 | Shimo-Ohsako et al. |
| 7,247,191 | B2 | 7/2007 | Koros et al. |
| 2003/0221559 | A1 | 12/2003 | Koros et al. |
| 2005/0268783 | A1 * | 12/2005 | Koros et al. ............ 96/14 |
| 2007/0117960 | A1 | 5/2007 | Kizuka et al. |

OTHER PUBLICATIONS

Koros, W.J. and Fleming, G.K., "Membrane-based gas separation", *Journal of Membrane Science* 83:1-80 (1993).

Ekiner O.M. and Vassilatos, G., "Polyaramide Hollow Fibers for Hydrogen/Methane Separation—Spinning and Properties", *Journal of Membrane Science* 53:259-273 (1990).

Prasad et al., "Evolution of membranes in commercial air separation", *J. Membrane Sci* 94:225-248 (1994).

Wind, et al., "Solid-State Covalent Cross-Linking of Polyimide Membranes for Carbon Dioxide Plasticization Reduction", *Macromolecules* 36:1882-1888 (2003).

Wallace, et al., "Efficient development of effective hollow fiber membranes for gas separations from novel polymers", *Journal of Membrane Science* 278:92-104 (2006).

Wallace, D., Crosslinked Hollow Fiber Membranes for Natural Gas Purification and their Manufacture from Novel Polymers, Ph.D. Dissertation, University of Texas, Aug. 2004.

Staudt-Bickel, C. and Koros, W.J., "Improvement of $CO_2/CH_4$ separation characteristics of polyimides by chemical crosslinking" *Jr. Membrane Sci.* vol. 155:145-154 (1999).

International Search Report from PCT/US2009/000029 mailed Mar. 6, 2009.

U.S. Appl. No. 12/007,466, filed Jan. 10, 2008, "Method of Making a High Molecular Weight, Monoesterified Polyimide Polymer".

* cited by examiner

FIG. 2 Monoesterification and Transesterifcation Reactions

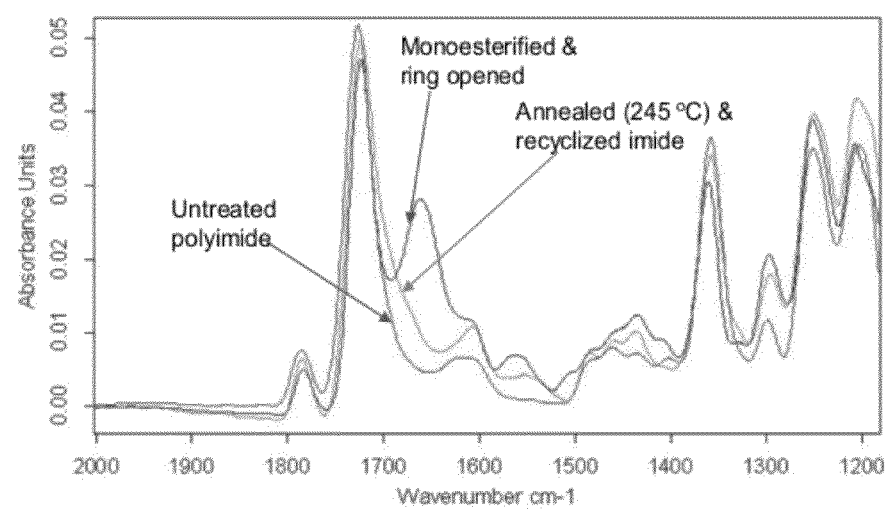
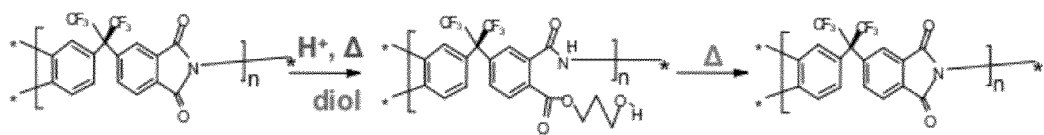
FIG. 8

FIGS. 9A & B
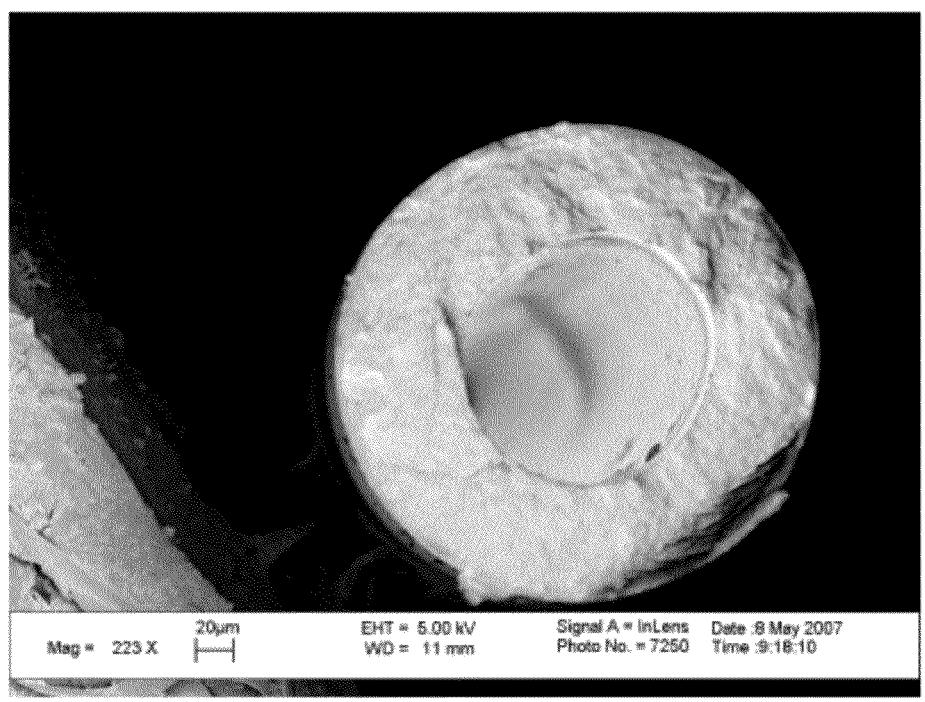
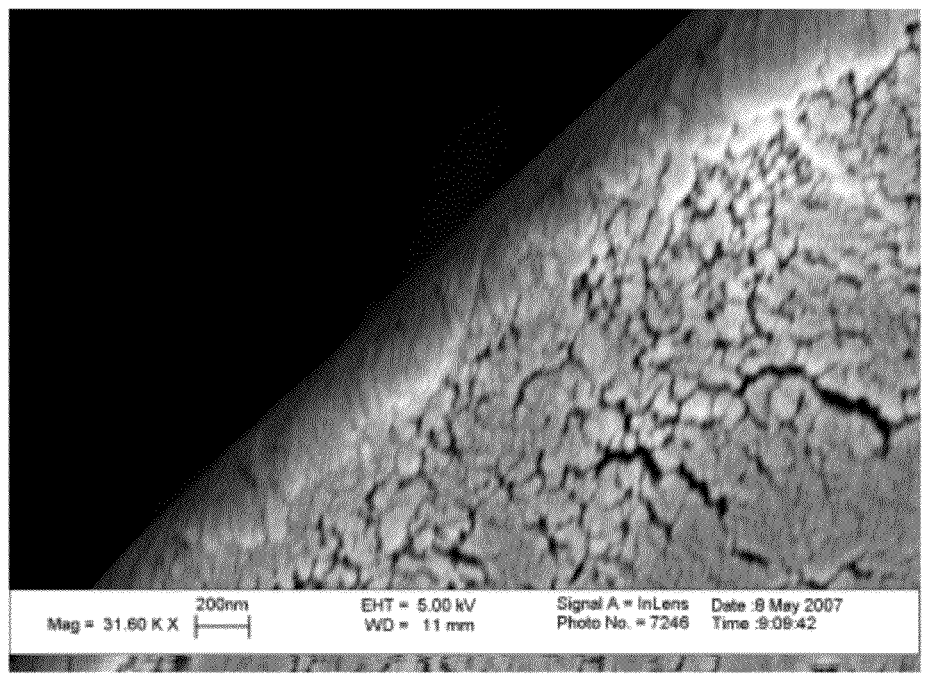

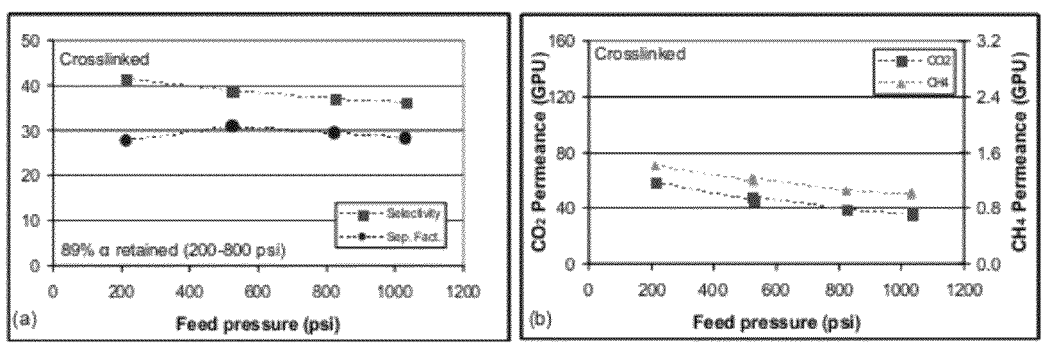
FIGS. 10A and B

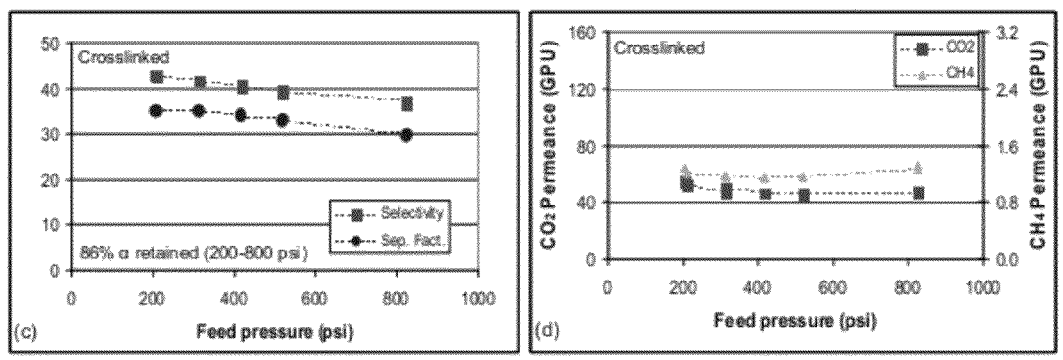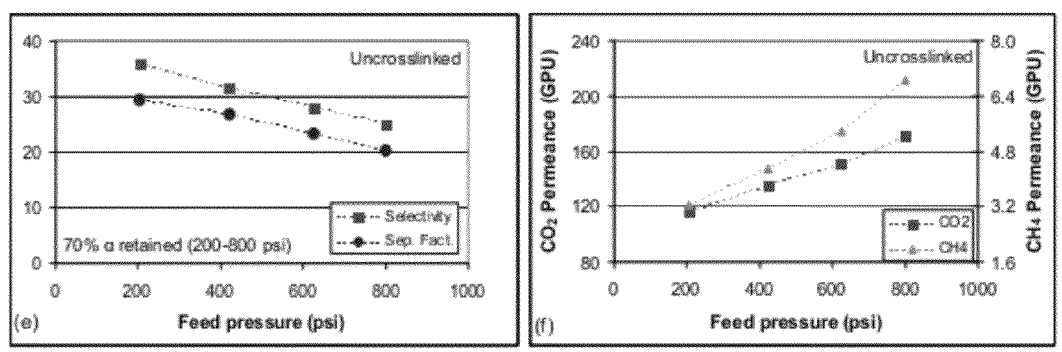
FIG. 11A-D

METHOD OF MAKING A CROSSLINKED FIBER MEMBRANE FROM A HIGH MOLECULAR WEIGHT, MONOESTERIFIED POLYIMIDE POLYMER

CROSS-REFERENCE TO RELATED APPLICATION

This application is a continuation of U.S. patent application Ser. No. 12/007,467, filed Jan. 10, 2008, the contents of which are incorporated herein by reference in its entirety.

FIELD OF ART

One method as described herein relates to making a high molecular weight, monoesterified polyimide polymer. Such high molecular weight, monoesterified polyimide polymers are useful in forming crosslinked polymer membranes for the separation of fluid mixtures. Another method as described herein relates to making the crosslinked membranes from the high molecular weight, monoesterified polyimide polymer. Yet another method as described herein relates to using the crosslinked membrane to separate at least one component from a feed stream including more than one component.

BACKGROUND

Polymeric membranes for separating mixtures of gases, such as methane and carbon dioxide are known. For example, U.S. Pat. Nos. 7,247,191; 6,932,859; and 6,755,900, which documents are incorporated by reference herein in their entireties, teach crosslinkable polymers and crosslinked hollow fiber membranes made from such crosslinkable polymers. These patents particularly describe a crosslinkable polyimide polymer. The crosslinkable polyimide polymer can be made by monoesterifying a polyimide polymer with a crosslinking agent.

A crosslinked hollow fiber membrane can be made by forming fibers from the crosslinkable polyimide polymer and transesterifying the crosslinkable polyimide polymer within the fibers. More specifically, the crosslinkable polyimide polymer can be formed into crosslinkable fibers, which are then subjected to transesterification conditions in order to create covalent ester crosslinks between the crosslinkable polyimide polymer within the fibers. Such fibers can be hollow fibers or other types of fibers. Crosslinked hollow fiber membranes can be incorporated into a separation module. Other types of membranes for separation include flat sheet separation membranes or flat stack permeators.

Separation modules utilizing hollow fiber membranes include a larger surface area than separation modules utilizing flat sheet or flat stack permeators. Therefore, hollow fiber separation modules have significant separation capability even in a reasonably compact size module. Module size is important in implementing separation modules on offshore platforms, where space and weight are at a premium, to separate mixtures of gases from hydrocarbon producing wells.

The crosslinked hollow fiber membranes have good permeability and selectivity. The crosslinked hollow fiber membranes also have good resistance to plasticization. Plasticization occurs when one or more components of a fluid mixture causes the polymer to swell thereby altering the properties of the membrane. For example, polyimides are particularly susceptible to plasticization by carbon dioxide. Subjecting the fibers to transesterification conditions to crosslink the crosslinkable polyimide polymer within the fibers increases both resistance to plasticization and selectivity.

The above referenced patents recommend that crosslinkable polyimide polymers having an average molecular weight that is not too high or too low be used to make the crosslinked hollow fiber membranes. They further state that the molecular weight of the polyimide polymer is degraded during the monoesterification process. Thus, they recommend use of sufficiently high molecular weight polyimide polymers to accommodate for molecular weight loss during the monoesterification process. However, it is difficult to produce crosslinkable polyimide polymers having such a high molecular weight.

Therefore, there is a need for a method of making a crosslinkable (i.e. monoesterified) polyimide polymer that reduces or eliminates the loss of molecular weight during the monoesterification process. In other words, there is a need for a method of making a high molecular weight, monoesterified polyimide polymer. There is also a need for a method of making a monoesterified polyimide polymer having improved strength, flexibility, and/or spinnability. Further, there is a need for a method of making separation membranes having improved selectivity and permeability.

SUMMARY

According to its broadest aspect, a method of making a crosslinked membrane comprises the following steps:

(a) preparing a polyimide polymer comprising carboxylic acid functional groups from a reaction solution comprising monomers and at least one solvent;

(b) treating the polyimide polymer with a diol at esterification conditions in the presence of dehydrating conditions to form a monoesterified polyimide polymer; and (c) subjecting the monoesterified fiber to transesterification conditions to form a crosslinked fiber membrane, wherein the dehydrating conditions at least partially remove water produced during step (b).

In one embodiment, the membrane can be a crosslinked hollow fiber membrane. A method of making a crosslinked hollow fiber membrane comprises the following steps:

(a) preparing a polyimide polymer comprising carboxylic acid functional groups from a reaction solution comprising monomers and at least one solvent;

(b) treating the polyimide polymer with a diol at esterification conditions in the presence of dehydrating conditions to form a monoesterified polyimide polymer;

(c) forming monoesterified fiber from the monoesterified polyimide polymer; and (d) subjecting the monoesterified fiber to transesterification conditions to form a crosslinked fiber membrane, wherein the dehydrating conditions at least partially remove water produced during step (b).

In steps (a) above, the monomers polymerize to provide a polyamide polymer comprising amide bonds and an imidization reaction occurs whereby the amide bonds in the polyamide polymer are converted to imide rings to provide a polyimide polymer. In steps (b) above, the polyimide polymer is monoesterified into the monoesterified polyimide polymer. The dehydrating conditions of step (b) have several effects. They can reduce, substantially eliminate, or completely eliminate loss in average molecular weight typically associated with monoesterification or even increase the average molecular weight of the monoesterified polyimide polymer relative to the polyimide polymer. Thus, the monoesterified polyimide polymer has a relatively high average molecular weight and is mechanically stronger, more flexible, and more easily and rapidly spun than its lower molecular weight counterparts.

Step (b) can further comprise treating the polyimide polymer with the diol in the presence of an acid catalyst in order to facilitate the monoesterification reaction. When the acid catalyst is present in amounts less than those typically used in conventional monoesterification reactions without water removal, the monoesterified polyimide polymer partially retains, fully retains, or even increases in molecular weight.

In some embodiments, step (a) also occurs under dehydrating conditions that at least partially remove water produced during the imidization reaction of step (a).

The monoesterified polyimide polymer is subjected to transesterification conditions to form a crosslinked membrane. The crosslinked membrane can be formed by known methods for forming membranes from polymers and then subjected to transesterification conditions for crosslinking. In the method for forming a crosslinked hollow fiber membrane, the monoesterified hollow fiber can be formed by known fiber forming techniques. Such hollow fiber also can be spun by means of a novel dry-jet/wet-quench spinning process from a novel spinning dope comprising the monoesterified polyimide polymer, a volatile component, a spinning solvent, a spinning non-solvent, and optionally an inorganic additive.

The crosslinked membrane produced according to the above described method from the high molecular weight, monoesterified polyimide polymer has enhanced permeability and selectivity characteristics compared to crosslinked membranes made by conventional methods, which use low molecular weight, monoesterified polyimide polymers and do not remove water. The crosslinked membrane can separate fluid mixtures, either gaseous or liquid, in a variety of configurations.

Further disclosed herein is a method of using the crosslinked membrane to separate gas mixtures. In its broadest aspect, such method includes the following steps:

(a) providing a feed stream selected from the group consisting of air, a mixture of methane and nitrogen, a mixture of methane and hydrogen, a mixture of methane and hydrogen sulfide, a refinery stream, a mixture of carbon dioxide and methane, and syngas, the feed stream including a gaseous component selected from the group consisting of nitrogen, oxygen, hydrogen, hydrogen sulfide and carbon dioxide;

(b) maintaining a pressure differential between an upstream side of the membrane and a downstream side of the membrane;

(c) contacting the upstream side of the membrane with the feed stream at a pressure between about 20 psia and about 4000 psia;

(d) isolating a permeate stream on the downstream side of the membrane having a larger mole fraction of the faster permeating component of the feed stream; and (e) isolating a retentate stream having a smaller mole fraction of the faster permeating component of the feed stream.

BRIEF DESCRIPTION OF THE DRAWINGS

FIG. 1 further includes schematic representations of crosslinked high molecular weight, monoesterified polyimide polymer chains and crosslinked low molecular weight, monoesterified polyimide polymer chains.

FIG. 8 shows an ATR-IR spectrum of the following: a crosslinked polymer prepared from the high molecular weight, monoesterified polyimide polymer made according to Example 4; the high molecular weight, monoesterified polyimide polymer made according to Example 4; and the polyimide polymer made according to Example 4.

FIGS. 9A-B are scanning electron microscopy (SEM) images of a monoesterified hollow fiber made according to Example 11.

FIGS. 10A-B are graphs illustrating the separation performance of monoesterified hollow fibers that have been subjected to transesterification conditions according to the method as described herein.

FIGS. 11A-D are graphs illustrating the separation performance of monoesterified hollow fibers made according to the method as described herein and monoesterified hollow fibers that have been subjected to transesterification conditions according to the method as described herein.

DETAILED DESCRIPTION

Figure 1:
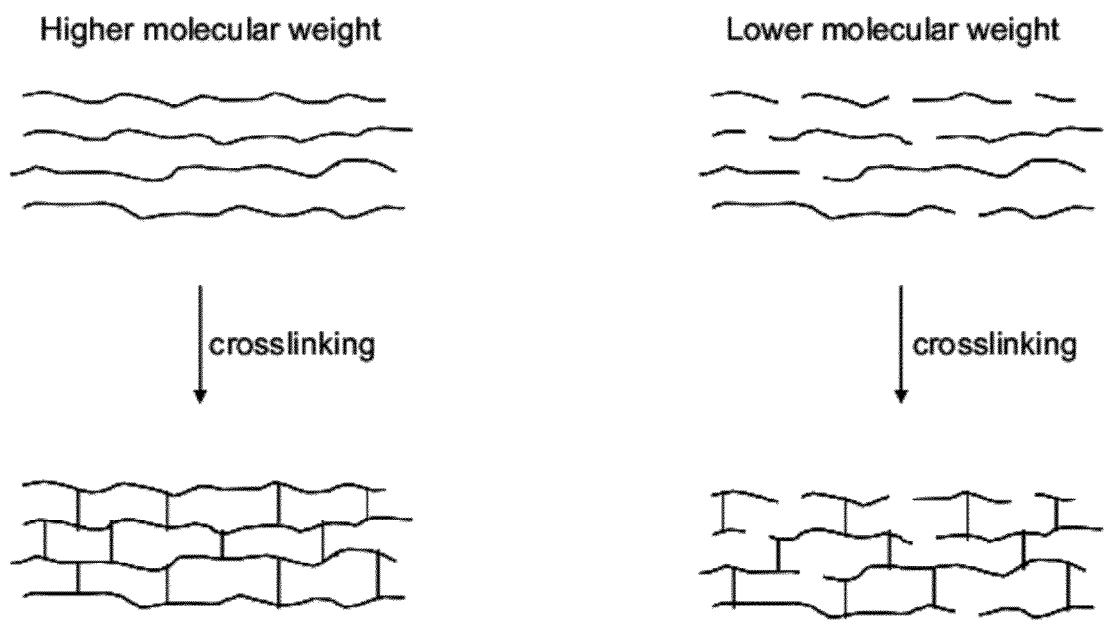
FIG. 1 includes schematic representations of high molecular weight, monoesterified polyimide polymer chains made by the method as described herein and low molecular weight, monoesterified polyimide polymer chains made by conventional methods.

A novel method of making a high molecular weight, monoesterified polyimide polymer is disclosed herein. Such method is based upon the unexpected discovery that removal of water produced during monoesterification of a polyimide polymer to provide a monoesterified, polyimide polymer reduces molecular weight loss during monoesterification. As a result, the monoesterified, polyimide polymer can have a molecular weight much closer to the molecular weight of the starting polyimide polymer. For example, the average molecular weight of the monoesterified, polyimide polymer can be greater than 60%, greater than 80%, or greater than 90% of the average molecular weight of the starting polyimide polymer. With water removal during monoesterification, it is also possible to produce a monoesterified, polyimide polymer having a molecular weight equal to or greater than the molecular weight of the polyimide polymer. As used herein, the term "high molecular weight, monoesterified polyimide polymer" refers to a monoesterified polyimide polymer having an average molecular weight greater than monoesterified polyimide polymers produced by conventional methods, which do not remove water during the monoesterification reaction. The high molecular weight, monoesterified polyimide polymer can have an average molecular weight between about 80,000 and about 220,000. For example, the high molecular weight, monoesterified polyimide polymer can have an average molecular weight between about 100,000 and about 200,000 or an average molecular weight between about 125,000 and about 200,000.

Also disclosed herein is a novel method of making a crosslinked membrane utilizing the high molecular weight, monoesterified polyimide polymer. The method includes forming the high molecular weight, monoesterified polyimide polymer. The method further includes crosslinking the monoesterified, polyimide polymer to form the crosslinked membrane.

In one embodiment, the crosslinked membrane is a crosslinked hollow fiber membrane. The crosslinked hollow fiber membrane is made utilizing the high molecular weight, monoesterified polyimide polymer. The method includes forming monoesterified fibers from the monoesterified, polyimide polymer. The method further includes crosslinking the monoesterified, polyimide polymer within the fibers to form the crosslinked hollow fiber membrane.

The method can specifically include a novel process for spinning monoesterified hollow fibers from a novel dope composition comprising the monoesterified, polyimide polymer.

The high molecular weight, monoesterified polyimide polymer as disclosed herein also can be cast to form sheets or films. The sheets or films can be cast onto a suitable support to provide a composite sheet.

The method of making a monoesterified, polyimide polymer as described herein comprises the following steps:

(a) preparing a polyimide polymer comprising carboxylic acid functional groups from a reaction solution comprising monomers and at least one solvent; and (b) treating the polyimide polymer with a diol at esterification conditions in the presence of dehydrating conditions to form a monoesterified polyimide polymer, wherein the dehydrating conditions at least partially remove water produced during step (b).

In step (a), monomers first polymerize to form a polyamide polymer comprising amide bonds. Next, in step (a), an imidization reaction occurs wherein the amide bonds of the polyamide polymer form imide bonds transforming the polyamide polymer into a polyimide polymer. The resultant polyimide polymer includes carboxylic acid functional groups which are capable of crosslinking chains of the polyimide polymer.

In step (b), a monoesterification reaction takes place. More specifically, the carboxylic acid functional groups (—COOH) of the polyimide polymer react with the hydroxyl functional groups (—OH) of the diol to convert the —COOH groups to esters. This provides a monoesterified polyimide polymer and water as a by-product. Each diol molecule contains two —OH groups. During monoesterification, only one of the —OH groups of each diol molecule reacts with a —COOH group. Ideally, the conversion of —COOH groups to esters (i.e. the ester yield) is almost 100%. However, in some cases, the ester yield can be less than 100%. Any unconverted —COOH groups can act as crosslinkable sites in a later transesterification reaction whereby monoesterified polyimide polymer chains are crosslinked.

Moreover, in step (b), dehydrating conditions at least partially remove the water by-product such that the average molecular weight of the monoesterified polyimide polymer is partially maintained, fully maintained, or even increased. It has been surprisingly discovered that at least partial removal of the water-byproduct, which is only present in very small amounts, affects molecular weight retention during the monoesterification reaction to a significant degree. While not wishing to be bound by any particular theory, it is believed that water can attack the imide rings of the polyimide polymer, which can cause chain scissioning and consequently reduce the average molecular weight of the polyimide polymer. These lower molecular weight polyimide polymer chains are then monoesterified resulting in a monoesterified, polyimide polymer lower in molecular weight than the original polyimide polymer. Up to about a 70% loss in molecular weight has been observed during monoesterification absent water removal. However, when dehydrating conditions are utilized, as described herein to eliminate at least some of the minimal amount of water present, a large molecular weight loss is not observed and a molecular weight gain has been obtained in certain instances.

While removal of the minimal amount of water produced during monoesterification may to some degree drive the monoesterification reaction forward, it is unexpected that removal of water is associated with smaller molecular weight loss, maintenance of molecular weight or even molecular weight gain.

It is unexpected and surprising that removal of the minimal amount of water from the monoesterification reaction has any significant effect on the monoesterification reaction or the monoesterified, polyimide polymer product. As there are relatively few —COOH groups in the polyimide polymer and —OH groups in the diol, a relatively insignificant amount of water is actually produced. Consequently, one of ordinary skill in the art would expect that water removal would have only a minimal effect on the forward reaction. Moreover, it is further unexpected and surprising that water removal would have any, much less a measurable, effect on the molecular weight of the polymer product because so little water by-product is produced and it is unexpected that water would effect the molecular weight of the monoesterified, polyimide polymer product.

FIG. 1 illustrates the effect of water removal during monoesterification. FIG. 1 depicts monoesterified, polyimide polymer chains made from high molecular weight monoesterified, polyimide polymers according to the method as described herein, which includes water removal. FIG. 1 also depicts monoesterified, polyimide polymer chains made from low molecular weight monoesterified, polyimide polymers according to conventional methods, which do not include water removal. The monoesterified, polyimide chains made by the method described herein are longer and have a greater average molecular weight than the monoesterified, polyimide chains made by conventional methods.

Relative to the low molecular weight, monoesterified polyimide polymers described in the published literature, the high molecular weight, monoesterified polyimide polymers made by the method as described herein have improved mechanical properties and processability. The polymers exhibit increased strength and flexibility and consequently can be spun at much higher rates.

The method of making a crosslinked membrane as described herein comprises the following steps:

(a) preparing a polyimide polymer comprising carboxylic acid functional groups from a reaction solution comprising monomers and at least one solvent;

(b) treating the polyimide polymer with a diol at esterification conditions in the presence of dehydrating conditions to form a monoesterified polyimide polymer; and (c) subjecting the monoesterified polyimide polymer to transesterification conditions to form a crosslinked membrane, wherein the dehydrating conditions at least partially remove water produced during step (b).

In one embodiment, the crosslinked membrane is a crosslinked hollow fiber membrane. The crosslinked hollow fiber membrane is made by a method comprising the following steps:

(a) preparing a polyimide polymer comprising carboxylic acid functional groups from a reaction solution comprising monomers and at least one solvent;

(b) treating the polyimide polymer with a diol at esterification conditions in the presence of dehydrating conditions to form a monoesterified polyimide polymer;

(c) forming monoesterified fiber from the monoesterified polyimide polymer; and (d) subjecting the monoesterified fiber to transesterification conditions to form a crosslinked hollow fiber membrane, wherein the dehydrating conditions at least partially remove water produced during step (b).

During steps (a) above, monomers are polymerized to form a polyamide polymer. Then, also in step (a), the polyamide polymer is converted to a polyimide polymer by means of an imidization reaction whereby amide bonds are converted to imide bonds.

During steps (b) above, the polyimide polymer reacts with the diol in a monoesterification reaction to form the monoesterified polyimide polymer. More specifically, —COOH groups of the polyimide polymer react with one of the —OH groups in each diol molecule to provide the monoesterified polyimide polymer and a water by-product, which is at least partially and contemporaneously removed from the monoesterification reaction. The monoesterification reaction of step (b) with water removal produces a monoesterified polyimide polymer having a higher molecular weight than a monoesterification reaction without any water removal.

To form the crosslinked membrane, the monoesterified polyimide polymer is subjected to transesterification conditions. The monoesterified polyimide polymer contains ester groups. The —OH groups in esters in the monoesterified polyimide polymer chain react with esters in another monoesterified polyimide polymer chain to form a transester or crosslink. When the ester yield during step (b) is less than 100%, —OH groups in esters in one monoesterified polyimide polymer chain also react with unconverted —COOH groups in another monoesterified polyimide polymer chain to form a crosslink. In this manner, the monoesterified polyimide polymer is crosslinked creating a crosslinked membrane.

In the crosslinked hollow fiber membrane, step (c) forms monoesterified fiber and in step (d) a crosslinked hollow fiber membrane is formed from the monoesterified fiber. The monoesterified fiber formed in step (c) contains monoesterified polyimide polymer, which contains ester groups. In step (d), —OH groups in esters in one monoesterified polyimide polymer chain within a fiber react with esters in another monoesterified polyimide polymer chain within the same fiber to form a transester or crosslink. When the ester yield during step (b) is less than 100%, —OH groups in esters in one monoesterified polyimide polymer chain within a fiber also react with unconverted —COOH groups in another monoesterified polyimide polymer chain within the same fiber to form a crosslink. In this manner, the monoesterified polyimide polymer within the fiber is crosslinked creating a crosslinked hollow fiber membrane.

Relative to membranes formed from lower molecular weight, monoesterified polyimide polymers, the present crosslinked membranes have improved separation characteristics, namely permeability and selectivity. The membranes exhibit resistance to plasticization during high pressure separation. The membranes can also exhibit high strength and flexibility due to the high molecular weight, monoesterified polyimide polymers from which it is made.

FIGS. 1C and 1D visually illustrate the effect of water removal during step (b) on the crosslinked hollow fiber membrane. FIG. 1C depicts crosslinked high molecular weight, monoesterified, polyimide polymer chains made according to the method as described herein with water removal. FIG. 1D depicts crosslinked low molecular weight, monoesterified, polyimide polymer chains made according to conventional methods without water removal. It can be seen that the polymer chains in FIG. 1C are significantly longer than the polymer chains in FIG. 1D. Thus, crosslinked hollow fiber membranes made according to the method as described herein are significantly stronger than previously made crosslinked hollow fiber membranes.

The membranes made from the high molecular weight, monoesterified polyimide polymer may take any form known in the art, for example, hollow fibers, tubular shapes, and other membrane shapes. Other membrane shapes include spiral wound membranes, pleated membranes, flat sheet membranes, and polygonal membranes. The high molecular weight, monoesterified polyimide polymer as disclosed herein can also be cast to form sheets or films. The sheets or films can be cast onto a suitable support to provide a composite sheet. The sheets and films can be cast onto a sheet of another polymer. This polymer support can be a porous and low cost polymer. As such, this porous polymer can be used as a support for a less porous sheet or film formed from the high molecular weight, monoesterified polyimide polymer as disclosed herein.

DEFINITIONS

The following terms are used throughout the specification and have the following meanings unless otherwise indicated.

As used herein, the term "carboxylic acid functional group" refers to a pendant group of —COOH—.

The term "diol" refers to a chemical compound containing two hydroxyl groups.

The term "carbodiimide" means a chemical compound containing the functional group N=C=N.

The term "dianhydride" refers to any compound that contains two anhydride

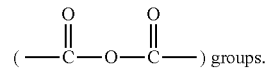

groups.

The term "halogenated alkyl" means a straight-chain or branched saturated monovalent hydrocarbon group of one to twelve carbon atoms, wherein at least one of the carbon atoms is replaced by a halogen atom (e.g. fluoromethyl, 1-bromoethyl, 2-chloro-pentyl, 6-iodo-hexyl, and the like).

The term "halo" or "halogenated" refers to a functional group including a halogen atom such as fluorine, chlorine, bromine, or iodine.

The term "phenyl" means an aromatic group of six carbon atoms having the formula —$C_6H_5$.

The term "alkyl" means a straight-chain or branched saturated monovalent hydrocarbon group of one to twelve carbon atoms (e.g. methyl, ethyl, i-propyl, and the like). Alkyl groups have the formula $C_nH_{2n+1}$ where n is a positive non-zero integer.

The term "diamino cyclic compound" means a chemical compound having a ring structure of three to twelve carbon atoms where the ring structure is functionalized by two amino or substituted amino groups.

The term "amino" means a functional group having the formula —NR'R" where R' and R" are independently H, alkyl, cycloalkyl, and aryl.

The term "cycloalkyl" means a cyclic saturated monovalent hydrocarbon group containing 3 to 12 carbon atoms having a single cyclic ring or multiple condensed rings. Such cycloalkyl groups include, by way of example, cyclopropyl, cyclohexyl, cyclooctyl, adamantanyl, and the like.

The term "aliphatic" refers to non-aromatic organic compounds, in which carbon atoms are joined together in straight or branched chains. Aliphatic includes paraffinic (e.g., alkyl), olefinic (e.g., alkenyl), and alkynyl compounds.

The term "antilyotropic salt" refers to a salt that interacts with solvent molecules rather than polymer molecules.

The term "amide" means a functional group having a carbonyl group (C=O) linked to a nitrogen atom or a compound that includes this functional group.

The term "ester" means a functional group having a carbonyl group (C=O) linked to a alkoxy group.

The term "alkoxy" refers to an alkyl group linked to an oxygen such as, for example, methoxy (—OCH$_3$) or ethoxy (—OCH$_2$CH$_3$).

The term "aryl" refers to an unsaturated aromatic carbocyclic group of from 6 to 20 carbon atoms having a single ring (e.g., phenyl) or multiple condensed (fused) rings (e.g., naphthyl or anthryl). Exemplary aryls include phenyl, naphthyl and the like.

The term "alkenyl" refers to a linear or branched unsaturated monovalent hydrocarbon group having 2 to 12 carbon atoms and containing at least one, for example, from 1 to 3 double bond(s). This term is exemplified by groups such as ethenyl (—CH=CH$_2$), 2-propenyl (—CH$_2$—CH=CH$_2$), and the like.

The term "alkynyl" refers to a linear or branched monovalent hydrocarbon group having 2 to 12 carbon atoms and containing at least one, for example, from 1 to 3 triple bond(s). This term is exemplified by groups such as ethynyl (—C≡CH), 2-propynyl (—CH$_2$—C≡CH), n-butynyl (—CH$_2$—CH$_2$—C≡CH), and the like.

As used herein, the term "reduce" means to decrease or diminish.

Whenever used herein, the term "molecular weight" or "average molecular weight" means weight average molecular weight as measured by Gel Permeation Chromatography (GPC) using polystyrene as the standard. This method is described in ASTM D5296-05.

"Draw ratio" means the ratio of the take-up rate to the extrusion rate.

Method of Making a High Molecular Weight, Monoesterified Polyimide Polymer:

Step (a)-Polymerization Reaction and Imidization Reaction

As stated above, step (a) involves preparing a polyimide polymer comprising carboxylic acid functional groups from a reaction solution comprising monomers and at least one solvent. The monomers and at least one solvent are combined such that the monomers dissolve in the solvent to form the reaction solution. Thereafter, the monomers polymerize through the formation of amide bonds to provide a polyamide polymer. The polyamide polymer is then subjected to imidization conditions whereby the amide bonds are converted to imide rings to provide a polyimide polymer.

The imidization reaction of step (a) can further take place under dehydrating conditions. Water is produced as a by-product during the imidization reaction. Such dehydrating conditions at least partially remove this water by-product from the reaction solution. It is desirable to remove water in step (a) because water produced during the imidization reaction can degrade the imide rings of the polyimide polymer during the subsequent monoesterification reaction. This residual imidization water can also cause chain scissioning of the polyimide polymer as the water produced during the monoesterification reaction. While the polyimide polymer could be precipitated out of the reaction solution as in conventional processes and then subjected to monoesterification, including dehydrating conditions in step (a) makes such a precipitation step unnecessary and the entire reaction can be a "one-pot" synthesis.

Monomers

The monomers can comprise between about 15 and about 25 weight percent of the reaction solution.

It is important that at least some of the monomers include carboxylic acid functional groups such that the resultant polyimide polymer comprises carboxylic acid functional groups. The monomers can include dianhydrides, tetracarboxylic acids, and furandiones. The monomers can further include diamino compounds such as diamino cyclic compounds and diamino aromatics. Such diamino aromatics can have more than one aromatic ring where the amino groups are on the same or different aromatic ring.

For example, the monomers can include monomers A, B, and C wherein A is a dianhydride of formula (I);

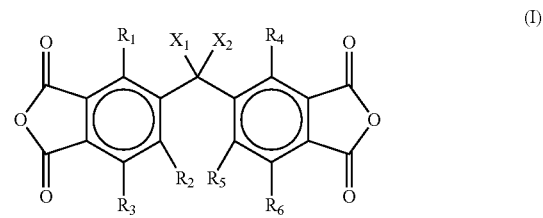

(I)

X$_1$ and X$_2$ are independently selected from halogenated alkyl, phenyl or halogen;
R$_1$, R$_2$, R$_3$, R$_4$, R$_5$, and R$_6$ are H, alkyl, or halogen;
B is a diamino cyclic compound without, a carboxylic acid functionality; and
C is a diamino cyclic compound with a carboxylic acid functionality.

If the monomers are comprised of the monomers A, B, and C, the ratio of B to C can be between 1:4 and 8:1.

The monomer A can be 4,4'-(hexafluoroisopropylidene) diphthalic anhydride (6FDA), which is also known as (2,2-bis(3,4-dicarboxyphenyl) hexafluoropropane. 6FDA has the following formula:

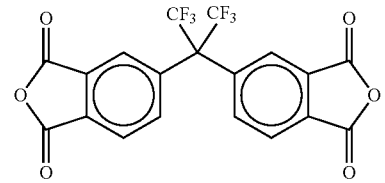

Including 6FDA in the monomers provides stability to the polyimide polymer because 6FDA has limited rotational ability.

Monomers with limited rotational ability, like 6FDA, are desirable because they increase the selectivity of the membrane made according to the method disclosed herein. Monomers with bulky side groups, like (CF$_3$)$_2$ in 6 FDA, also inhibit chain packing, which increases permeability of molecules through the membrane. Both selectivity and permeability are important for efficient and productive separations. Further reference to these structure property relationships can be found in Koros and Fleming, *Journal of Membrane Science*, 83, 1-80 (1993), herein incorporated by reference in its entirety.

percent and about 100 percent of the remaining about 50 weight percent. For example, the 6FDA content of the monomer mixture can be about 50 percent and the remaining about 50 percent can be about 40 percent DABA and about 60 percent DAM. When 6FDA, DAM, and DABA are present in these stoichiometric concentrations, the polyimide polymer formed in step (a) is represented by the formula (II):

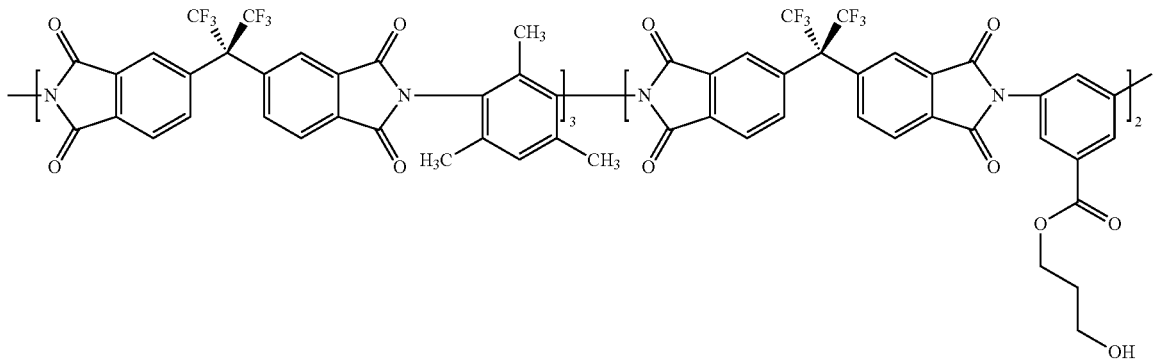

(II)

The monomer B, a diamino cyclic compound without a carboxylic acid functionality, can be a diamino aromatic compound with more than one aromatic ring where the amino groups are on the same or different aromatic ring. For example, the monomer B can be 4,4' isopropylidene dianiline, 3,3' hexafluoroisopropylidene dianiline, 4,4' hexafluoroisopropyliene dianiline, 4,4' oxydianiline, 3,3' oxydianiline, 4,4' diaminodiphenyl, diaminotoluene, diaminobenzotrifluoride, dimethyldiaminobenzene, trimethyldiaminobenezene, or tetramethyldiaminobenzene. The monomer B can also be 2,4,6-trimethyl-m-phenylenediamine (DAM), which is represented by the following formula:

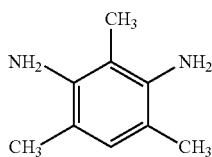

The monomer C, a diamino cyclic compound with a carboxylic acid functionality, can be diamino benzoic acid. It is represented by the following formula:

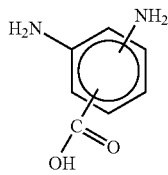

More specifically, the monomer C can be 3,5 diaminobenzoic acid (DABA).

In one embodiment of the method as described herein, the monomers include A, B, and C where A is 6FDA, B is DAM, and C is DABA. In this embodiment, the 6FDA content of the monomer mixture is about 50 percent and the remaining about 50 percent of the monomer mixture is composed of DAM and DABA. The DABA content is between about 20

In another embodiment of the method as described herein, the monomers include A, B, and C where A is 6FDA, B is DAM, and C is DABA as well as one or more additional dianhydrides.

Whichever monomers are used, according to some embodiments of the method as described herein, they can be purified prior to step (a). The monomers can be purified by techniques known in the art, for example, sublimation or recrystallization.

Solvents

The monomers are dissolved in at least one solvent to create a reaction solution and facilitate polymerization. The resulting polyamide polymer remains in the reaction solution for imidization. The at least one solvent can comprise between about 75 and about 95 weight percent of the reaction solution. The at least one solvent can be at least one high boiling organic solvent. The solvent can also be mixtures of organic solvents. Exemplary high boiling organic solvents are listed in Table 1 along with their normal boiling points.

TABLE 1

| High boiling organic solvent | Normal boiling point (° C.) |
|---|---|
| N-Methyl-2-pyrrolidione (NMP) | 202.1 |
| Dimethyl sulfoxide (DMSO) | 190 |
| Dimethylformamide (DMF) | 152.9 |
| Dimethylacetamide (DMAc) | 165.1 |
| Diglyme | 162 |

Accordingly, the solvent of the reaction solution can be any one of the organic solvents listed above or mixtures thereof. High boiling solvents are desirable because they prevent excessive evaporation, which would significantly alter concentrations in the reaction solution and concentrations during subsequent processing.

Dehydrating Conditions

If dehydrating conditions are utilized during step (a) to remove water, the concentration of water in the reaction solution can be maintained at between about 0 weight percent and about 0.26 weight percent.

The dehydrating conditions can be the presence of a chemical dehydrating agent and/or a mechanical dehydrating agent.

The dehydrating conditions can be the presence of a chemical dehydrating agent only, a mechanical dehydrating agent only, or the combination of a chemical dehydrating agent and a mechanical dehydrating agent.

If a chemical dehydrating agent is utilized, the chemical dehydrating agent does not impede the imidization reaction of step (a). For example, it does not decrease the imidization reaction rate or decrease the monoesterified, polyimide polymer yield. The chemical dehydrating agent can form an azeotrope with water, which can be boiled out of the reaction solution. Such azeotropic chemical dehydrating agents are well known to one of ordinary skill in the art. Exemplary azeotropic chemical dehydrating agents include ortho-dichlorobenzene (ODCB), benzene, toluene, and mixtures thereof. Alternatively, the chemical dehydrating agent can be a carbodiimide.

If an azeotropic chemical dehydrating agent is used as the chemical dehydrating agent, it can be used in relatively large amounts, for example, between about 1 ml and about 4 ml per gram of the polyamide polymer. Such a large amount of azeotropic chemical dehydrating agent ensures that the water produced by the imidization reaction is removed from the reaction solution.

If a carbodiimide is used as the chemical dehydrating agent, it can be used in an amount between about 1 and about 4 times the stoichiometric amount based on moles of water removed.

The chemical dehydrating agent can also be periodically added to the reaction solution throughout step (a). For example, ODCB can be added periodically. According to one embodiment of the method as described herein, the chemical dehydrating agent is added to the reaction solution in three separate batches.

If a mechanical dehydrating agent is utilized, the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the reaction solution from returning to the reaction solution can be suitable.

Polymerization Conditions

In the polymerization reaction of step (a), monomers polymerize in the reaction solution to form a polyamide polymer. Polymerization can occur at room temperature while the reaction solution is stirred or otherwise agitated. Solvent concentration during polymerization is between about 75 and about 95 weight percent of the reaction solution.

Imidization Conditions

In the imidization reaction of step (a), the amide bonds of the polyamide polymer form imide rings to provide the polyimide polymer. The imidization reaction in step (a) occurs over an extended period of time, approximately 12-36 hours. Such an extended period of time ensures that the imidization reaction proceeds to completion, which is important with respect to yield of the polyimide polymer. The imidization reaction can occur at temperatures between about 160° C. and about 200° C. Solvent concentration during imidization is between about 75 and about 95 weight percent of the reaction solution.

Step (b)-Monoesterification Reaction

Step (b) involves treating the polyimide polymer with a diol at esterification conditions in the presence of the dehydrating conditions to form a monoesterified polyimide polymer. Thus, during step (b), the polyimide polymer is subjected to monoesterification. After the imidization reaction of step (a) is complete, the reaction solution comprises the polyimide polymer, the at least one solvent, and any unreacted monomers. The diol can be directly added to the reaction solution as a crosslinking agent to form a monoesterification reaction solution. Thus, both the imidization reaction of step (a) and the monoesterification reaction of step (b) can take place in one reaction vessel or "one pot." Alternatively, the polyimide polymer can be isolated and then combined with the diol to form a monoesterification reaction solution such that the imidization reaction of step (a) and the monoesterification reaction of step (b) take place in separate reaction vessels.

Figure 2:
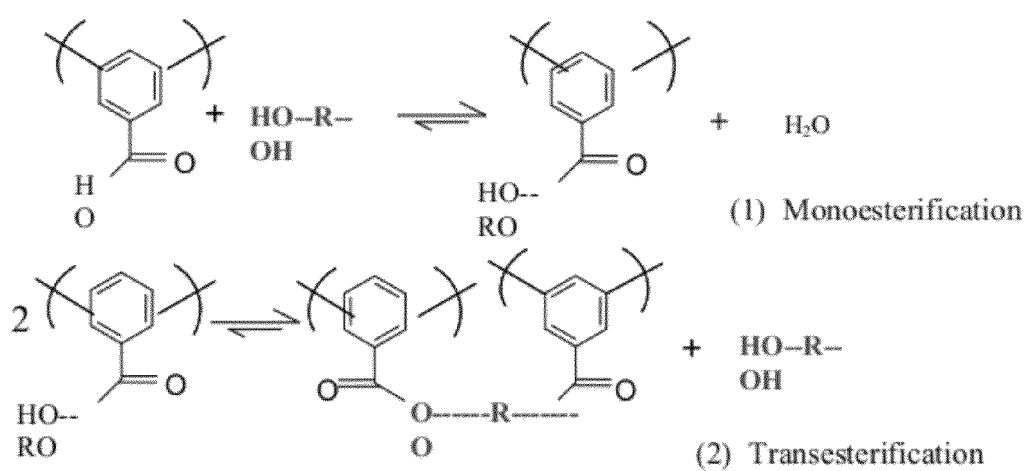
FIG. 2 shows both a monoesterification reaction and a transesterification reaction.

FIG. 2 schematically illustrates the monoesterification reaction. As explained above, the monoesterification reaction involves one of the —OH groups in the diol molecules reacting with the —COOH groups of the polyimide polymer to convert the —COOH groups to esters and provide the monoesterified polyimide polymer. Water is also produced as a by-product during monoesterification. Importantly, in the method as described herein, at least a portion of the water is removed from the monoesterification reaction solution by the dehydrating conditions.

Along with the diol, an acid catalyst can also be added to the reaction solution to facilitate the monoesterification reaction.

The monoesterified polyimide polymer produced by step (b) can have an average molecular weight between about 80,000 and 220,000. In one embodiment, the monoesterified polyimide polymer has an average molecular weight between about 100,000 and about 200,000. In another embodiment, the monoesterified polyimide polymer has an average molecular weight between about 125,000 and about 200,000. The monoesterified polyimide polymer can also have a polydispersity index between about 2 and about 4.

Diol

In the present method, the length of the diol is an important consideration. If the diol is too long or too short, it can decrease the permeability and/or selectivity of a membrane formed from the monoesterified, polyimide polymer.

Diols useful in the method as described herein include ethylene glycol, propylene glycol, 1,3 propanediol, 1,4 butanediol, 1,2 butanediol, benzenedimethanol, 1,3 butanediol, and mixtures thereof. In one embodiment of the method as described herein, the diol is selected from the group consisting of ethylene glycol, propylene glycol, 1,3 propanediol, benzenedimethanol, and mixtures thereof. In another embodiment, the diol is selected from the group consisting of ethylene glycol, propylene glycol, 1,3 propanediol, and mixtures thereof. In yet another embodiment, the diol is selected from the group consisting of ethylene glycol, 1,3 propanediol, and mixtures thereof. In still another embodiment, the diol is 1,3 propanediol.

Dehydrating Conditions

As with the optional dehydrating conditions of step (a), the dehydrating conditions of step (b) can result from a chemical dehydrating agent and/or a mechanical dehydrating agent. Therefore, the dehydrating conditions can be a chemical dehydrating agent alone, a mechanical dehydrating agent alone, or the combination of a chemical dehydrating agent and a mechanical dehydrating agent. It is desirable that the dehydrating conditions, whether chemical or mechanical, remove water produced during step (b) from the monoesterification reaction solution such that the concentration of water in the monoesterification reaction solution is maintained at between about 0 weight percent and about 0.08 weight percent.

If a chemical dehydrating agent is utilized, the chemical dehydrating agent does not impede the monoesterification reaction of step (b). For example, it does not decrease the monoesterification reaction rate or decrease the monoesterified, polyimide polymer yield. The chemical dehydrating agent can be an azeotropic chemical dehydrating agent or can be a carbodiimide. An azeotropic chemical dehydrating agent forms an azeotrope with the water by-product, which can be boiled out of the monoesterification reaction solution. Such azeotropic chemical dehydrating agents are well known to those of ordinary skill in the art and include ODCB, benzene, toluene, and mixtures thereof.

A carbodiimide functions as a chemical dehydrating agent by participating in the monoesterification reaction by activating the carboxylic acid functionality of the polyimide polymer toward ester formation and thereby eliminating the water by-product at the same time. This carbodiimide dehydration reaction mechanism is depicted below:

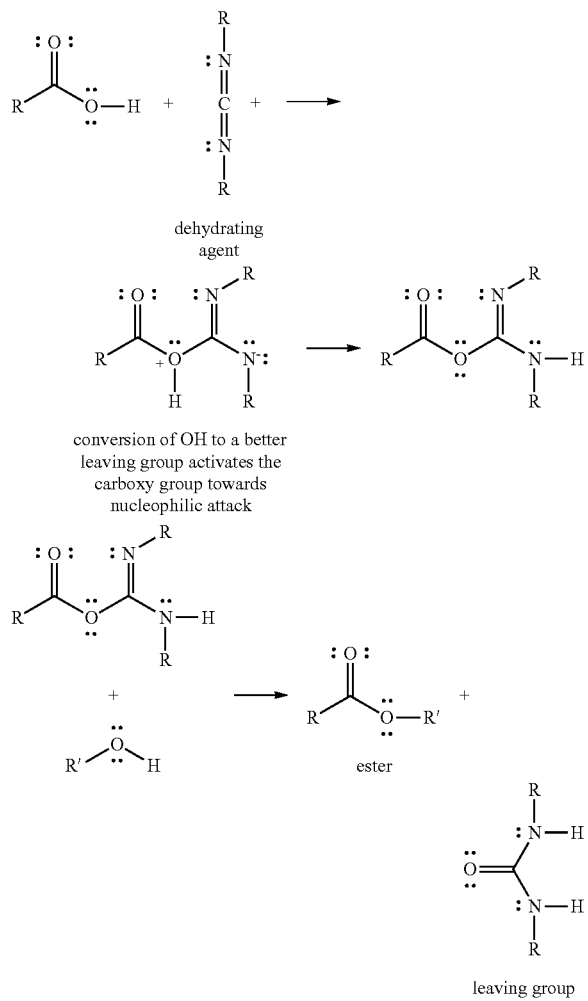

If an azeotropic chemical dehydrating agent is used as the chemical dehydrating agent, it can be used in relatively large amounts, for example, between about 1 ml to about 4 ml per gram polyimide polymer. Such a large amount of azeotropic chemical dehydrating agent ensures that the water produced by the monoesterification reaction is removed from the monoesterification reaction solution.

If a carbodiimide is used as the chemical dehydrating agent, it can be used in an amount between about 1 and about 4 times the stoichiometric amount based on the moles of water removed.

The chemical dehydrating agent can also be periodically added to the monoesterification reaction solution throughout step (b). For example, ODCB can be added periodically. According to one embodiment of the method as described herein, the chemical dehydrating agent is added to the monoesterification reaction solution in three separate batches.

As in step (a), the mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the monoesterification reaction solution from returning to the monoesterification reaction solution is suitable.

If dehydrating conditions are utilized in step (a), the dehydrating conditions of step (b) can be the same as the dehydrating conditions of step (a). In fact, it is desirable for the dehydrating conditions to be the same because this simplifies the overall method as described herein. In conventional polymerization/imidization/monoesterification reaction methods, the polyimide polymer is precipitated out of the reaction solution. However, this extra precipitation step is eliminated when the same dehydrating conditions are utilized during monoesterification. Further, dehydrating conditions remaining from the imidization reaction of step (a) can be employed in the monoesterification reaction of step (b).

Acid Catalyst

Acid catalysts useful in monoesterification reactions are well known to those of skill in the art. Acid catalysts activate the carboxyl functional groups of the polyimide polymer so that they will react with the hydroxyl groups of the diol. Acid catalysts replace acid chlorides as carboxyl functional group activators. The use of acid chlorides as carboxyl functional group activators is set forth in Example 1 of U.S. Pat. No. 6,755,900, which is incorporated by reference in its entirety herein. Exemplary acid catalysts include para-toluene sulfonic acid, sulfuric acid, methanesulfonic acid, triflic acid, and mixtures thereof. If the dehydrating conditions utilized include a carbodiimide, acid catalyst may not be necessary because the carboxyl functional group of the polyimide polymer is activated by the carbodiimide.

It has been discovered that the amount of acid catalyst present during the monoesterification reaction, under dehydrating conditions, also effects the average molecular weight of the monoesterified, polyimide polymer. More particularly, it has been discovered that when the amount of acid catalyst used is less than the conventional amount and dehydrating conditions are present, significantly less molecular weight loss, no molecular weight loss, or even molecular weight gain, occurs. While not wishing to be bound by any particular theory, it is believed that excess acid catalyst augments degradation of the imide rings of the polyimide polymer, which causes undesirable chain scissioning and loss of average molecular weight. If DABA monomers are used in the method as described herein, the amount of acid catalyst can be further reduced from the conventional amount. This is due to the fact that DABA monomers are intrinsically acidic.

Between about 0 milligrams and about 0.25 milligrams of acid catalyst can be added to the monoesterification reaction solution per gram of the polyimide polymer without experiencing undesirable molecular weight loss.

Monoesterification Conditions

The monoesterification reaction solution, with or without catalyst, is heated to a relatively high temperature over an extended period of time. Generally, the monoesterification reaction solution is heated for approximately 12-30 hours at a temperature between about 120° C. and about 140° C.

In small (volume) scale reactions, the dehydrating conditions can remove water more easily than in large (volume) scale reactions because the surface area to volume ratio of the reaction vessel is higher. Such a higher ratio facilitates boiling of the water.

In large (volume) scale reactions, it is advantageous for both the imidization reaction of step (a) and the monoesterification reaction of step (b) to occur in the same reaction vessel. Then any dehydrating conditions remaining from the imidization reaction then be easily utilized during the monoesterification reaction.

Method of Making a Crosslinked Membrane

The membranes made from the high molecular weight, monoesterified polyimide polymer may take any form known in the art, for example, hollow fibers, tubular shapes, and other membrane shapes. Other membrane shapes include spiral wound membranes, pleated membranes, flat sheet membranes, and polygonal membranes. The high molecular weight, monoesterified polyimide polymer as disclosed herein can also be cast to form sheets or films.

Steps (a) and (b)

Step (a)-Polymerization Reaction and Imidization Reaction

Step (a) involves preparing a polyimide polymer comprising carboxylic acid functional groups from a reaction solution comprising monomers and at least one solvent. The monomers and at least one solvent are combined such that the monomers dissolve in the solvent to form the reaction solution. Thereafter, the monomers polymerize through the formation of amide bonds to provide a polyamide polymer. The polyamide polymer is then subjected to conditions whereby the amide bonds form imide rings to provide a polyimide polymer.

Step (a) can further take place under dehydrating conditions. Water is produced as a by-product during the imidization reaction. Such dehydrating conditions at least partially remove this water by-product from the reaction solution. It is desirable to remove water in step (a) because water produced during the imidization reaction can degrade the imide rings of the polyimide polymer during the subsequent monoesterification reaction. This residual imidization water can cause chain scissioning of the polyimide polymer as the water produced during the monoesterification reaction. While the polyimide polymer could be precipitated out of the reaction solution as in conventional processes and then subjected to monoesterification, including dehydrating conditions in step (a) makes such a precipitation step unnecessary and the entire reaction can be a "one-pot" synthesis.

Step (b)-Monoesterification Reaction

Step (b) involves treating the polyimide polymer with a diol at esterification conditions in the presence of the dehydrating conditions to form a monoesterified polyimide polymer. Thus, during step (b), the polyimide polymer is subjected to monoesterification. After the imidization reaction of step (a) is complete, the reaction solution comprises the polyimide polymer, the at least one solvent, and any unreacted monomers. The diol can be directly added to the reaction solution as a crosslinking agent to form a monoesterification reaction solution. Thus, both the imidization reaction of step (a) and the monoesterification reaction of step (b) can take place in one reaction vessel or "one pot." Alternatively, the polyimide polymer can be isolated and then combined with the diol to form a monoesterification reaction solution such that the imidization reaction of step (a) and the monoesterification reaction of step (b) take place in separate reaction vessels.

Water is also produced as a by-product during monoesterification. Importantly, in the method as described herein, the water is removed from the monoesterification reaction solution by the dehydrating conditions.

Along with the diol, an acid catalyst can also be added to the reaction solution to facilitate the monoesterification reaction.

The monoesterified polyimide polymer produced by step (b) can have an average molecular weight between about 80,000 and about 220,000. In one embodiment, it has an average molecular weight between about 100,000 and about 200,000. In another embodiment, it has an average molecular weight between about 125,000 and about 200,000. It can also have a polydispersity index between about 2 and about 4.

Dehydrating Conditions

If dehydrating conditions are utilized during step (a) to remove water, the concentration of water in the reaction solution can be maintained at between about 0 weight percent and about 0.26 weight percent. Due to the dehydrating conditions of step (b), the concentration of water in the monoesterification reaction solution can be maintained at between about 0 weight percent and about 0.08 weight percent.

The dehydrating conditions can be the presence of a chemical dehydrating agent and/or a mechanical dehydrating agent. The dehydrating conditions can be the presence of a chemical dehydrating agent only, a mechanical dehydrating agent only, or the combination of a chemical dehydrating agent and a mechanical dehydrating agent.

If a chemical dehydrating agent is utilized, the chemical dehydrating agent does not impede the imidization reaction of step (a) or the monoesterification reaction of step (b). For example, it does not decrease the imidization reaction rate or the monoesterification reaction rate and does not decrease the polyimide polymer yield or the monoesterified, polyimide polymer yield. The chemical dehydrating agent can form an azeotrope with water, which can be boiled out of the reaction solution. Such azeotropic chemical dehydrating agents are well known to one of ordinary skill in the art. Exemplary azeotropic chemical dehydrating agents are ortho-dichlorobenzene (ODCB), benzene, toluene, and mixtures thereof. Alternatively, the chemical dehydrating agent can be a carbodiimide, which participates in the monoesterification reaction and intrinsically eliminates the water by-product at the same time.

If an azeotropic chemical dehydrating agent is used as the chemical dehydrating agent, it can be used in relatively large amounts, for example, between about 1 ml and about 4 ml per gram of polyamide polymer or polyimide polymer. Such a large amount of azeotropic chemical dehydrating agent ensures that the water produced by the imidization reaction and/or monoesterification reaction is removed.

The chemical dehydrating agent can also be periodically added to the reaction solution throughout step (a) and/or the monoesterification reaction solution throughout step (b). For example, ODCB can be added periodically. According to one embodiment of the method as described herein, the chemical dehydrating agent is added to the reaction solution in three separate batches and/or the chemical dehydrating agent is added to the monoesterification reaction solution in three separate batches.

The mechanical dehydrating agent is a physical system designed to remove water. An exemplary mechanical dehydrating agent is a Dean-Stark trap. Dean-Stark traps are well known to those of ordinary skill in the art. Any mechanical system that prevents water distilled from the reaction solution and/or monoesterification reaction solution from returning to the reaction solution and/or monoesterification reaction solution, respectively, is suitable.

If dehydrating conditions are utilized in step (a), the dehydrating conditions of step (b) can be the same as the dehydrating conditions of step (a). In fact, it is desirable for the dehydrating conditions to be the same because this simplifies the overall method as described herein. In conventional polymerization/imidization/monoesterification reaction methods, the polyimide polymer is precipitated out of the reaction solution. However, this extra precipitation step is eliminated when the same dehydrating conditions are utilized during monoesterification. Further, dehydrating conditions remaining from the imidization reaction of step (a) can be employed in the monoesterification reaction of step (b).

Crosslinked Hollow Fiber Membranes: Formation of Monoesterified Fiber

In the method for forming crosslinked hollow fiber membranes, step (c) involves forming monoesterified hollow fiber from the monoesterified polyimide polymer. Because the monoesterified polyimide polymer has a high average molecular weight, the monoesterified hollow fiber formed from such polymer exhibits increased strength and flexibility. If the monoesterified polyimide polymer is spun into monoesterified hollow fibers, such increased strength and flexibility allow the polymer to be spun at higher take-up rates.

To make such monoesterified hollow fiber, the monoesterified polyimide polymer can be incorporated into a spinning dope, which is spun into monoesterified hollow fiber by means of a spinning process such as a wet-quench/dry-jet spinning process. While a wet-quench/dry-jet spinning process is discussed in detail below, it should be appreciated that other types of spinning methods (e.g. wet spinning) can be used to form the monoesterified hollow fiber.

As described herein, the membranes made from the high molecular weight, monoesterified polyimide polymer may take any form known in the art, including hollow fibers, tubular shapes, and other membrane shapes. As such, the high molecular weight, monoesterified polyimide polymer can be cast to form sheets or films. The sheets or films can be cast onto a suitable support to provide a composite sheet. The sheets and films can be cast onto a sheet of another polymer. This polymer support can be a porous and low cost polymer. As such, this porous polymer can be used as a support for a less porous sheet or film formed from the high molecular weight, monoesterified polyimide polymer.

Spinning Dope to Form Monoesterified Hollow Fiber

The spinning dope is a homogeneous one phase solution and can comprise the monoesterified polyimide polymer, a volatile component, an optional inorganic additive, a spinning solvent, and a spinning non-solvent.

Polymer concentration is a matter of concern. Sufficient polymer must be present in order to form strong fibers and membranes capable of withstanding high pressures. However, too much polymer increases resistance in the membrane substructure and adversely affects membrane performance. In one embodiment of the method as described herein, the monoesterified polyimide polymer is present in the spinning dope in an amount between about 20 and about 50 weight percent. In another embodiment, the monoesterified polyimide polymer is present in the spinning dope in an amount between about 25 and about 45 weight percent. In yet another embodiment, the monoesterified polyimide polymer is present in the spinning dope in an amount between about 30 and about 40 weight percent.

The volatile component can be an organic solvent with a specified room temperature vapor pressure and a specified boiling point. Such an organic solvent aids in the formation of the dense skin separation layer of the hollow fiber. It effectively and efficiently evaporates during the dry-jet step of the wet-quench/dry-jet spinning process and evaporation on the outside of the nascent fiber is believed to help keep the polymer chains more entangled and at a higher concentration, which promotes vitrification and formation of the dense skin. The specified room temperature vapor pressure of the organic solvent can be greater than about 0.05 bar. Alternatively, the specified room temperature vapor pressure can be greater than about 0.1 bar. As another alternative, the specified room temperature vapor pressure can be greater than about 0.2 bar. The specified boiling point of the organic solvent can be between about 30° C. and about 100° C. Alternatively, the specified boiling point can be between about 40° C. and about 90° C. As another alternative, the specified boiling point can be between about 50° C. and about 70° C.

Exemplary organic solvents include tetrahydrofuran (THF) and acetone. In one embodiment of the method as described herein, the volatile component is present in the spinning dope in an amount between about 5 and about 25 weight percent. In another embodiment, the volatile component is present in the spinning dope in an amount between about 5 and about 20 weight percent. In yet another embodiment, the volatile component is present in the spinning dope in an amount between about 10 and about 15 weight percent.

The optional inorganic additive can enhance phase separation, increase substructure porosity, and increase viscosity of the spinning dope. Since the monoesterified, polyimide polymer has a large quantity of carboxyl functional groups, it is more hydrophilic than most traditional polymers used in spinning processes. Therefore, it takes a longer time for the monoesterified polyimide polymer to separate during the wet-quench step. The optional inorganic additive reduces the time necessary for phase separation of the monoesterified polyimide polymer.

The optional inorganic additive can be an antilyotropic salt. As defined herein, the term "antilyotropic salt" refers to a salt that interacts with solvent molecules rather than polymer molecules. See Ekiner O. M. et al., *Journal of Membrane Science* 53 (1990) 259-273. Exemplary antilyotropic salts include $LiNO_3$, $LiClO_4$, $MgCl_2$, $ZnCl_2$, and NaI.

Concentration of the inorganic additive is also a matter of concern. While the inorganic additive can reduce the time required for phase separation, it is believed that excess inorganic additive (e.g. $LiNO_3$) can cause defect formation if the porosity extends into the non-vitrified skin layer of the hollow fiber. In one embodiment of the method as described herein, the concentration of antilyotropic salt in the spinning dope is between about 0 and about 10 weight percent. In another embodiment, the concentration of the antilyotropic salt in the spinning dope is between about 2 and about 8 weight percent. In yet another embodiment, the concentration of the antilyotropic salt in the spinning dope is between about 4 and about 7 weight percent.

The spinning solvent can be a high boiling organic solvent. Exemplary high boiling organic solvents are listed in Table 1 above, along with their normal boiling points. A high boiling organic solvent that has a high affinity for water can enhance phase separation of the hollow fiber in the wet-quench step of the spinning process. NMP is a particularly desirable spinning solvent because it dissolves many polymers used in spinning, is relatively benign compared to other spinning solvents, and has a high affinity for water. The concentration of the spinning solvent can be dependent upon many factors, including the molecular weight of the monoesterified polyimide polymer, the polydispersity index of the monoesterified polyimide polymer, and the other components of the spinning dope, and can be determined by the precipitation method discussed below.

The spinning non-solvent can be an alcohol, such as an aliphatic alcohol, or water. In one embodiment of the method as described herein, the spinning non-solvent in a lower boiling aliphatic alcohol aliphatic alcohol, for example, methanol or ethanol. The normal boiling points of methanol and ethanol are 64.7° C. and 78.4° C., respectively. Some spinning non-solvents (e.g. ethanol) can also serve as an additional volatile component. The concentration of the spinning non-solvent is directly dependent upon the spinning solvent concentration and can also be determined by the precipitation method discussed below.

The concentrations of spinning solvent and spinning non-solvent can be determined by an iterative precipitation method wherein the concentrations of the spinning solvent and the spinning non-solvent are dependent upon the respective concentrations of the monoesterified polyimide polymer, the volatile component, and the optional inorganic additive. Such precipitation method ensures that the spinning dope is a homogeneous one-phase solution, but is still close to the point of precipitation in order to reduce the phase separation time during the wet-quench step.

According to the precipitation method, the concentrations of the monoesterified polyimide polymer, the volatile component, and the optional inorganic additive are set. Initial concentrations of the spinning solvent and the spinning non-solvent are then chosen. The components, in these concentrations, are combined in a small sample vial. First, the volatile component, the spinning solvent, and the spinning non-solvent are mixed to form a solution. Next, the optional inorganic additive is added to the solution. After the optional inorganic additive dissolves in the solution, the monoesterified polyimide polymer is added to the solution to provide a spinning dope sample. The polymer can be added in batches to facilitate dispersion of the polymer throughout the solution. If the polymer precipitates out, the spinning solvent concentration is increased anywhere between about 0 weight percent and about 5 weight percent to arrive at the final spinning solvent concentration. The spinning non-solvent concentration is similarly decreased to arrive at the final spinning non-solvent concentration. If the polymer does not precipitate out, the concentration of the spinning solvent and/or the spinning non-solvent is altered and the precipitation test is repeated. Iterations occur until final concentrations are obtained that provide a homogeneous one-phase spinning dope close to the point of precipitation.

A larger amount of spinning dope can be prepared according to these final concentrations. It is advantageous to carry out the precipitation method with small sample amounts of spinning dope before spinning any batch of the spinning dope because the point of precipitation can vary as the structure and/or average molecular weight of the polymer varies.

Dry-Jet/Wet-Quench Spinning Process to Form Monoesterified Hollow Fiber

If a dry-jet/wet-quench spinning process is used to spin the high molecular weight, monoesterified polyimide polymer into hollow fibers, several benefits can be realized. First, the hollow fibers can be spun at higher take-up rates. Second, the dry-jet step can increase chain entanglement, which hypothetically forms skin on the hollow fibers. Third, the high molecular weight polymer can increase dope viscosity, which allows the spinning dope to be spun at elevated dope temperatures. Such elevated dope temperatures are required for evaporative skin formation.

Dry-jet/wet-quench spinning processes are well known in the art. Generally, in a dry-jet/wet-quench spinning process, spinning dope comprising a polymer is extruded into filaments through orifices of a spinneret, which is separated from a coagulating bath by a gaseous layer or non-coagulating liquid. The filaments are passed through the gaseous layer, such as air, or non-coagulating liquid, such as toluene or heptane, and then conducted into a coagulating bath. Conveyance of the filaments through the gaseous layer is commonly referred to as the dry-jet step. The coagulating bath can be an either an aqueous system, such as pure water, or a non-aqueous system, such as methanol. Conveyance of the filaments through the coagulating bath is commonly referred to as the wet-quench step. After the filaments leave the coagulating bath, they can be washed. Washing is especially important if the coagulating bath contains any acid and can be accomplished with water alone or combinations of alkaline solutions and water. The filaments are dried and wound on a rotating drum. They can be air dried on the drum or the drum can be heated to facilitate drying.

According to an embodiment of the method of making the crosslinked hollow fiber membrane as described herein, a monoesterified polyimide polymer is extruded through orifices of a spinneret to provide a hollow fiber. This hollow fiber is conveyed through a gaseous layer of air and through a coagulating bath of de-ionized water. The fibers exit the de-ionized water bath and are wound around a take-up drum.

The take-up drum can be partially contained in a vessel of room temperature de-ionized water in order to keep the fiber wet. The fiber can be left on the take-up drum for between about 10 minutes and about 20 minutes and then cut into strands and left in another de-ionized water bath for between about 2 days and about 3 days. The de-ionized water baths help remove solvent from the fiber. The fibers can then be dehydrated by fluid exchange with non-solvents of decreasing surface tension, for example, ethanol and hexane. Ultimately, the fibers can be air-dried and/or oven-dried.

According to the method as described herein, the spinneret orifices can have smaller dimensions than those used in conventional spinning processes. Smaller spinneret dimensions permit spinning of hollow fibers under normal conditions into fibers useful for making membranes that can be used under high pressure conditions (i.e. fibers with a diameter of less than 300 microns). The smaller spinneret dimensions also improve mixing in the spinneret and shearing during extrusion. Further, the smaller spinneret dimensions increase the extrusion velocity and consequently decrease the draw ratio (i.e. the take-up rate divided by the extrusion rate). Reduced draw ratios are desirable because excessively high draw ratios can induce high orientation/elongation stresses, which may be detrimental during further processing like crosslinking. For example, it was found that when hollow fibers were spun with a spinneret having larger dimensions, high draw ratios had to be applied to achieve fibers of reasonable dimensions (less than 300 microns) and these fibers became defective after crosslinking.

The annular diameter of the spinneret orifices can be approximately half the size of conventional spinneret orifices. For example, the annular diameter can be between about 600 microns and about 1300 microns and the bore needle outer diameter can be between about 300 microns and about 700 microns.

The draw ratio can be less than 150. Alternatively, the draw ratio can be less than 100. As another alternative, the draw ratio can be less than 50. As still another alternative, the draw ratio can be less than 10.

The distance between the point of extrusion out of the spinneret and the surface of the de-ionized water bath is referred to herein as the "air gap height." The air gap height must be greater than 0 cm. The air gap height can be greater than 5 cm. Alternatively, the air gap height can be greater than 10 cm. As another alternative, the air gap height can be greater than 20 cm. Larger air gap heights favor skin formation.

Similarly, relatively high spinning dope temperatures (i.e. the temperature of the spinning dope just before extrusion through the spinneret) favor skin formation. The spinning dope temperature can be greater than 40° C. Alternatively, the spinning dope temperature can be greater than 50° C. As yet another alternative, the spinning dope temperature can be greater than 60° C.

As stated above, according to one embodiment, the coagulating bath contains de-ionized water. A sufficiently high coagulating bath temperature ensures adequate phase separation in the coagulating bath. If phase separation is inadequate, the fibers will be crushed in the first guide roll after extrusion. The coagulating bath temperature can be between about 10° C. and about 70° C. Alternatively, the coagulating bath temperature can be between about 25° C. and about 60° C. As another alternative, the coagulating bath temperature can be between about 40° C. and about 50° C.

The take-up rate (i.e. the speed at which the hollow fibers are wound around the take-up drum) can be much greater than take-up rates used when spinning low molecular weight polymers. This is due to the fact that the high molecular weight polymers as described herein can withstand the greater stresses associated with higher take-up rates. The take-up rate can be increased with a fixed extrusion rate if a smaller diameter fiber is required. Take-up rates between about 20 m/min and about 150 m/min are achievable according to the method as described herein.

The face velocity of air surrounding the spinneret can be greater than 50 ft/min. Alternatively; the face velocity of air surrounding the spinneret can be greater than 80 ft/min. As another alternative, the face velocity of air surrounding the spinneret can be greater than 100 ft/min.

Transesterification Reaction

The transesterification reaction involves subjecting the monoesterified polyimide polymer to transesterification conditions to form a crosslinked membrane. FIG. 2 schematically illustrates the transesterification reaction. In the transesterification reaction, the —OH groups in esters in one monoesterified polyimide polymer chain react with esters in another monoesterified polyimide polymer chain to form a transester or crosslink. Any unconverted —COOH groups in one monoesterified polyimide polymer chain can also react with —OH groups in esters in another monoesterified polyimide polymer chain to form a crosslink. In this manner, the transesterification reaction crosslinks the monoesterified polyimide polymer chains.

The crosslinked hollow fiber membrane is comprised of individual fibers of crosslinked polyimide polymer chains. For example, the crosslinked hollow fiber membrane can comprise a potted array of such fibers.

The crosslinked membrane is suitable for separating fluid mixtures, including both gaseous mixtures and liquid mixtures. The crosslinked hollow fiber membrane exhibits better permeability and selectivity than crosslinked hollow fiber membranes made from low molecular weight, monoesterified polyimide polymers.

Transesterification Conditions

Typical transesterification conditions are known in the art. Generally, transesterification can be accomplished by heating the monoesterified polyimide polymer. Heating initiates the transesterification reaction and, additionally, removes residual solvent.

The monoesterified, polyimide polymer can be heated to crosslink at a temperature of about 150° C. or higher under vacuum. In one embodiment, the monoesterified, polyimide polymer is heated to crosslink at a temperature of about 180° C. or higher under vacuum. In another embodiment, the monoesterified, polyimide polymer is heated to crosslink at a temperature of about 200° C. or higher under vacuum. For example, the monoesterified hollow fibers can be heated under vacuum at 200° C. for approximately 2 hours and cooled under vacuum for approximately 6 hours. Higher temperatures result in a greater degree of crosslinking. However, temperatures of about 300° C. or higher may damage the skin layer of a crosslinked hollow fiber membrane made according to the method as described herein. Transesterification can also be accomplished by UV or microwave treatment. Furthermore, transesterification reactions can be catalyzed. Transesterification catalysts can be the same acid catalysts used during monoesterification, which include para-toluene sulfonic acid, sulfuric acid, methanesulfonic acid, triflic acid, and mixtures thereof.

Method of Using the Membranes

A mixture containing gases to be separated can be enriched by passing the gas mixture through the membrane as disclosed herein. Such gas mixture to be enriched can originate from a hydrocarbon well such as an oil or gas well including an offshore well. It is also possible to enrich a mixture of liquids to be separated by passing the liquid mixture through the membrane as disclosed herein.

For example, the crosslinked membrane can be used to separate gases by:

(a) providing a feed stream selected from the group consisting of air, a mixture of methane and nitrogen, a mixture of methane and hydrogen, a mixture of methane and hydrogen sulfide, a refinery stream, a mixture of carbon dioxide and methane, and syngas, the feed stream including a gaseous component selected from the group consisting of nitrogen, oxygen, hydrogen, hydrogen sulfide and carbon dioxide;

(b) maintaining a pressure differential between an upstream side of the membrane and a downstream side of the membrane;

(c) contacting the upstream side of the membrane with the feed stream at a pressure between about 20 psia and about 4000 psia;

(d) isolating a permeate stream on the downstream side of the membrane having a larger mole fraction of the faster permeating component of the feed stream; and (e) isolating a retentate stream having a smaller mole fraction of the faster permeating component of the feed stream.

In one embodiment, the membrane can be a crosslinked hollow fiber membrane. The feed stream can be enriched in the gaseous component at a temperature between about 25° C. and 200° C. As an alternative, the feed stream can be at a pressure from about 50 psia to about 4000 psia. As another alternative, the feed stream can be at a pressure from about 200 psia to about 1000 psia. The temperature of the feed stream can be its temperature as produced from a hydrocarbon well (e.g. a oil or gas well including an offshore well). These conditions can be varied using routine experimentation depending on the feed streams. The downstream side of the membrane can be maintained as a vacuum.

A variety of gas mixtures can be purified with the membrane as disclosed herein. For example, applications include enrichment of air by nitrogen and oxygen, carbon dioxide removal from methane streams, hydrogen sulfide removal from methane streams, nitrogen or hydrogen removal from methane streams, or carbon monoxide from syngas streams. The membrane can also be used in hydrogen separation from refinery streams and other process streams, for example from the dehydrogenation reaction effluent in the catalytic dehydrogenation of paraffins. Generally, this membrane may be used in any separation process with gas mixtures involving, for example, hydrogen, nitrogen, methane, hydrogen sulfide, carbon dioxide, carbon monoxide, helium, and oxygen.

If additional purification is required, the product in the permeate stream can be passed through additional membranes, and/or the product can be purified via distillation using techniques well known to those of skill in the art. Typically, membrane systems may consist of many modules connected in various configurations. See, for example, Prasad et al., *J. Membrane Sci.*, 94, 225-248 (1994), the contents of which are incorporated by reference herein in their entirety for background and review. Modules connected in series offer many design possibilities to purify the feed, permeate, and residue streams to increase the separation purity of the streams and to optimize the membrane system performance.

Separation Systems Including the Membranes

Membranes as disclosed herein can be used in separation systems like those discussed in U.S. Pat. Nos. 6,932,859 and 7,247,191, which are incorporated herein by reference in their entirety.

The membranes made from the high molecular weight, monoesterified polyimide polymer may take any form known in the art, for example, hollow fibers, tubular shapes, and other membrane shapes. Other membrane shapes include spiral wound membranes, pleated membranes, flat sheet membranes, and polygonal membranes.

Hollow fibers as described herein can be employed in bundled arrays potted at either end to form tube sheets and fitted into a pressure vessel thereby isolating the insides of the tubes from the outsides of the tubes. The fibers are held together by any conventional means. Typically one end of the fiber bundle extends to one end of the pressure shell and the opposite end of the fiber bundle extends to the opposite end of the pressure shell. The fiber bundle is fixably or removably affixed to the pressure shell by any conventional method to form a pressure tight seal. Devices of this type are known in the art. In separation systems of this type, the direction of flow in a hollow fiber element can be counter-current rather than co-current or even transverse.

Such counter-current flow can be achieved by wrapping the hollow fiber bundle in a spiral wrap of flow-impeding material. This spiral wrap extends from a central mandrel at the center of the bundle and spirals outward to the outer periphery of the bundle. The spiral wrap contains holes along the top and bottom ends whereby gas entering the bundle for tube side flow at one end is partitioned by passage through the holes and forced to flow parallel to the hollow fiber down the channel created by the spiral wrap. This flow direction is counter-current to the direction of flow inside the hollow fiber. At the bottom of the channels the gas re-emerges from the hollow fiber bundle through the holes at the opposite end of the spiral wrap and is directed out of the module.

Industrial hollow fiber membrane modules typically contain hundreds of thousands of individual hollow fibers. The number of fibers bundled together will depend on fiber diameters, lengths, and porosities and on desired throughput, equipment costs, and other engineering considerations understood by those in the chemical engineering arts.

Specifically, to maximize productivity, the hollow fibers typically include an ultrathin (<2000 Angstroms) "skin" layer on a porous support. Gas separation is accomplished through this selective "skin." This outer "skin" layer may be supported on the same polymer to form an integrally skinned asymmetric hollow fiber membrane. The most advanced membranes have an asymmetric sheath with the selective skin supported on an inexpensive porous core layer (different polymer) to form a composite hollow fiber membrane. This type of device is described in U.S. Pat. No. 5,085,676, the contents of which are incorporated by reference herein in their entirety.

Sheets can be used to fabricate a flat stack permeator that includes a multitude of membrane layers alternately separated by feed-retentate spacers and permeate spacers. The layers can be glued along their edges to define separate feed-retentate zones and permeate zones. Devices of this type are described in U.S. Pat. No. 5,104,532, the contents of which are herein incorporated by reference in their entirety.

The membranes can be included in a separation system that includes an outer perforated shell surrounding one or more inner tubes that contain membranes. The shell and the inner tubes can be surrounded with packing to isolate a contaminant zone.

In one mode of operation, a gaseous mixture enters the separation system via a contaminant collection zone through the perforations in the outer perforated shell. The gaseous mixture passes upward through the inner tubes.

As the gaseous mixture passes through the inner tubes, one or more components of the mixture permeate out of the inner tubes through the selective membrane and enter the contaminant collection zone.

The membranes can be included in a cartridge and used for permeating contaminants from a gaseous mixture. The contaminants can permeate out through the membrane, while the desired components continue out the top of the membrane. The membranes may be stacked within a perforated tube to form the inner tubes or may be interconnected to form a self-supporting tube.

Each one of the stacked membrane elements may be designed to permeate one or more components of the gaseous mixture. For example, one membrane may be designed for removing carbon dioxide, a second for removing hydrogen sulfide, and a third for removing nitrogen. The membranes may be stacked in different arrangements to remove various components from the gaseous mixture in different orders.

Different components may be removed into a single contaminant collection zone and disposed of together, or they may be removed into different zones. The membranes may be arranged in series or parallel configurations or in combinations thereof depending on the particular application.

The membranes may be removable and replaceable by conventional retrieval technology such as wire line, coil tubing, or pumping. In addition to replacement, the membrane elements may be cleaned in place by pumping gas, liquid detergent, or other material past the membrane to remove materials accumulated on the membrane surface.

A gas separation system including the membranes described herein may be of a variable length depending on the particular application.

The gaseous mixture can flow through the membrane(s) following an inside-out flow path where the mixture flows into the inside of the tube(s) of the membranes and the components which are removed permeate out through the tube. Alternatively, the gaseous mixture can flow through the membrane following an outside-in flow path.

In order to prevent or reduce possibly damaging contact between liquid or particulate contaminates and the membranes, the flowing gaseous mixture may be caused to rotate or swirl within an outer tube. This rotation may be achieved in any known manner, for example, using one or more spiral deflectors. A vent may also be provided for removing and/or sampling components removed from the gaseous mixture.

Ideally, the membranes are durable, resistant to high temperatures, and resistant to exposure to liquids. The materials may be coated, ideally with a polymer, to help prevent fouling and improve durability. Examples of suitable polymers include those described in U.S. Pat. Nos. 5,288,304 and 4,728,345, the contents of which are incorporated by reference herein in their entirety. Barrier materials may also be used as a pre-filter for removing particulates and other contaminants which may damage the membranes.

EXAMPLES

Abbreviations

6FDA refers to 4,4'-(hexafluoroisopropylidene)diphthalic anhydride, which is also known as (2,2-bis(3,4-dicarboxyphenyl) hexafluoropropane.
DAM refers to 2,4,6-trimethyl-m-phenylenediamine.
DABA refers to 3,5 diaminobenzoic acid.
ODCB refers to ortho-dichlorobenzene.
NMP refers to N-methyl-2-pyrrolidone.
$^1$H-NMR means Proton Nuclear Magenetic Resonance.
ATR-IR means attenuated total reflection infrared.
THF refers to tetrahydrofuran.
SEM means Scanning Electron Microscopy.
NPT refers to a type of pipe fitting by Swagelok.
GPU refers to Gas Permeation Unit, which is defined by the following formula:

GPU=[volume of gas passed by the membrane at standard temperature and pressure $(cm^3) \times 10^{-6}$]/[permeating area of the membrane $(cm^2) \times$ permeation time(s)$\times$partial pressure differences across the membrane (cmHg)]

Example 1

Preparation of Monoesterified, Polyimide Polymers

Several batches of monoesterified, polyimide polymers were made. In making each batch, the following steps were performed. 6FDA, DAM, and DABA monomers were dissolved in NMP and left for about 24 hours to provide polyamide polymer. ODCB was added to the solution and the solution was heated at 160-200° C. to provide polyimide polymer. NMP was added to the solution to decrease the concentration of the polyimide polymer to approximately 6 weight percent and 1,3 propanediol was added to the solution. Between 40 and 70 times the required stoichiometric amount of 1,3 propanediol was added. The resulting solution was heated for up to 24 hours at 120-140° C. while distilling of the water by-product. A 50/50 vol % water/methanol solution was added to the solution and homogenized. A monoesterified, polyimide polymer was precipitated from the homogenized solution and air-dried. The monoesterified, polyimide polymer was further dried in a vacuum oven at 70° C. for 24 hours.

The batches of monoesterified, polyamide polymers had an average molecular weight between 130,000 and 184,000 as measured by Gel Permeation Chromatography (GPC) and a polydispersity index between about 3.3 and 3.8.

Example 2

Imidization and Monoesterification with 5 mg Acid Catalyst Per Gram Polyimide Polymer 6FDA, DAM, and DABA monomers were dissolved in NMP and left for about 24 hours to provide polyamide polymer. ODCB was added to the solution and the solution was heated for 18 hours at approximately 190° C. A polyimide polymer having an average molecular weight of 92,000 as measured by GPC and a polydispersity index of 3.0 was precipitated from the reaction solution.

The polyimide polymer was dissolved in solution together with 5 mg para-toluene sulfonic acid per gram polyimide polymer and 1,3 propanediol and the solution was heated for 18 hours at 140° C. A monoesterified, polyimide polymer having an average molecular weight of 38,000 as measured by GPC and a polydispersity index of 4.8 was precipitated from the solution.

Example 3

Imidization and Monoesterification with 5 mg Acid Catalyst Per Gram Polyimide Polymer 6FDA, DAM, and DABA monomers were dissolved in NMP and left for about 24 hours to provide polyamide polymer. ODCB was added to the solution and the solution was heated for 26 hours at approximately 190° C. A polyimide polymer having an average molecular weight of 103,000 as measured by GPC and a polydispersity index of 3.0 was precipitated from the solution.

The polyimide polymer was dissolved in solution together with 5 mg para-toluene sulfonic acid per gram polyimide polymer and 1,3 propanediol and the solution was heated for 18 hours at 140° C. A monoesterified, polyimide polymer having an average molecular weight of 32,000 as measured by GPC and a polydispersity index of 3.6 was precipitated from the solution.

Example 4

Imidization and Monoesterification with 2.5 mg Acid Catalyst Per Gram Polyimide Polymer 6FDA, DAM, and DABA monomers were dissolved in NMP and left for about 24 hours to provide polyamide polymer. ODCB was added to the solution and the solution was heated for 26 hours at approximately 190° C. A polyimide polymer having an average molecular weight of 103,000 as measured by GPC and a polydispersity index of 3.0 was precipitated from the solution.

The polyimide polymer was dissolved in solution together with 2.5 mg para-toluene sulfonic acid and 1,3 propanediol and the solution was heated for 22 hours at 130° C. A monoesterified, polyimide polymer having an average molecular weight of 129,000 as measured by GPC and a polydispersity index of 3.3 was precipitated from the solution.

This example demonstrates that using a reduced amount of acid catalyst has a profound effect on the average molecular weight of the monoesterified, polyimide polymer product. Examples 2 and 3, which utilized 5 mg para-toluene sulfonic acid, had a 59% and a 69% loss in average molecular weight, respectively. This example, which utilized only 2.5 mg para-toluene sulfonic acid, had a 25% increase in average molecular weight.

Comparative Example 5

Observations Regarding Low Molecular Weight, Monoesterified Polyimide Polymers and High Molecular Weight, Monoesterified Polyimide Polymers A low molecular weight, monoesterified polyimide polymer was made by a conventional monoesterification reaction (i.e. without water removal) as described in any one of Examples 1-3 of U.S. Pat. No. 6,932,859, which document is incorporated by reference herein in its entirety. The low molecular weight, monoesterified polyimide polymer included 6FDA, DAM, and DABA monomers and was represented by the following formula:

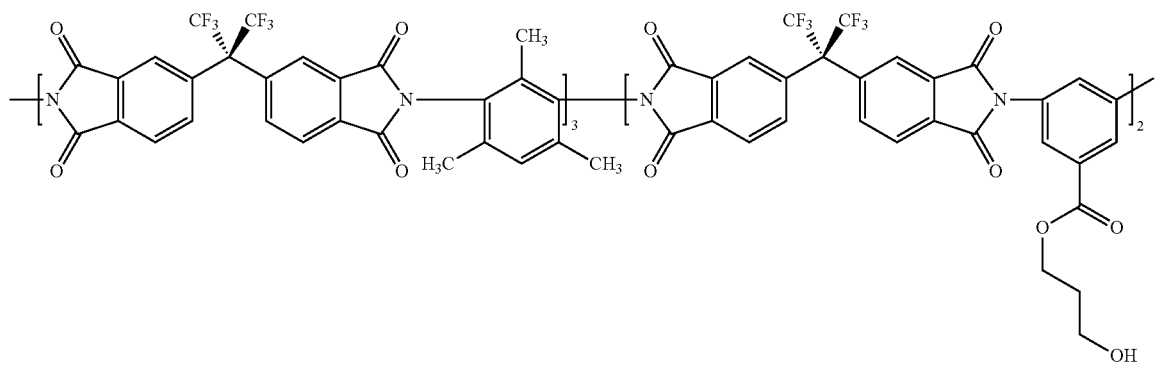

Figure 4:
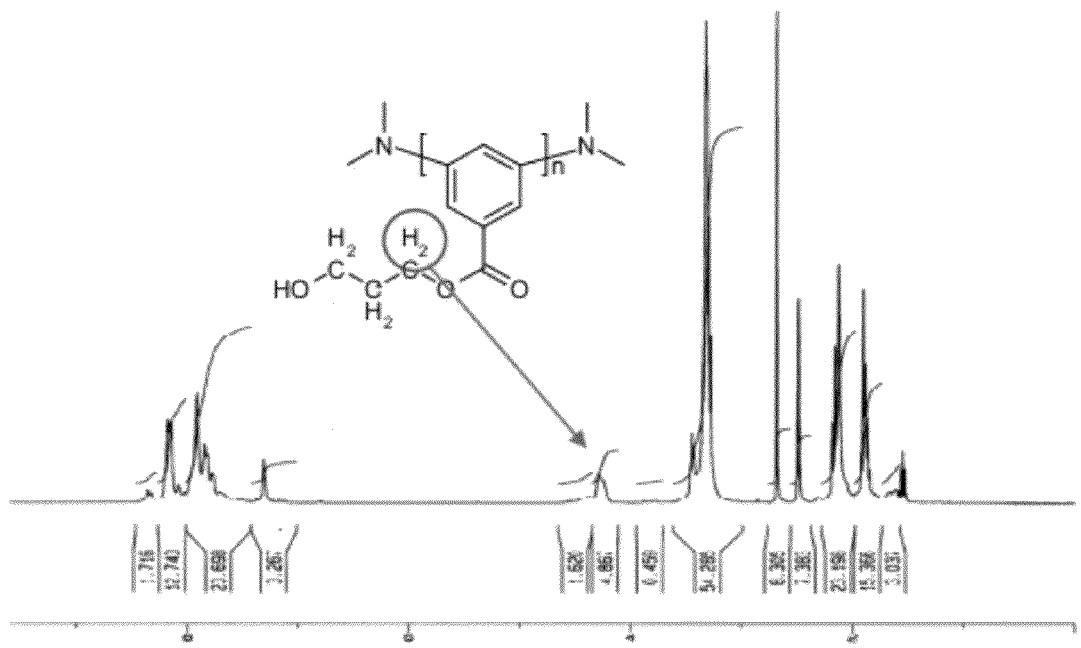
FIG. 4 shows a $^1$H-NMR spectrum of a low molecular weight, monoesterified polyimide polymer made according to a conventional monoesterification reaction.

¹H-NMR was performed on the low molecular weight, monoesterified polyimide polymer. FIG. 4 shows the ¹H-NMR spectrum.

The ester yields were monitored during such conventional monoesterification reaction. It was found that during such conventional monoesterification reaction, ester yields were observed to be more than the theoretical expected yield at 100% conversion calculated by the methods used in U.S. Pat. No. 6,755,900 and by Wind et al., Macromolecules, 2003, 36, 1882-1888, which documents are incorporated herein in their entirety. In these documents, conversions can be calculated by (1) the ratio of aromatic protons and aliphatic protons of the methylene group next to the ester group and (2) the ratio of DAM-methyl protons and the methylene group next to the ester group.

It is believed that these higher ester yields are a result of opened imide rings caused by hydrolysis.

The chain scissioning effect of hydrolyzed imide rings is illustrated below:

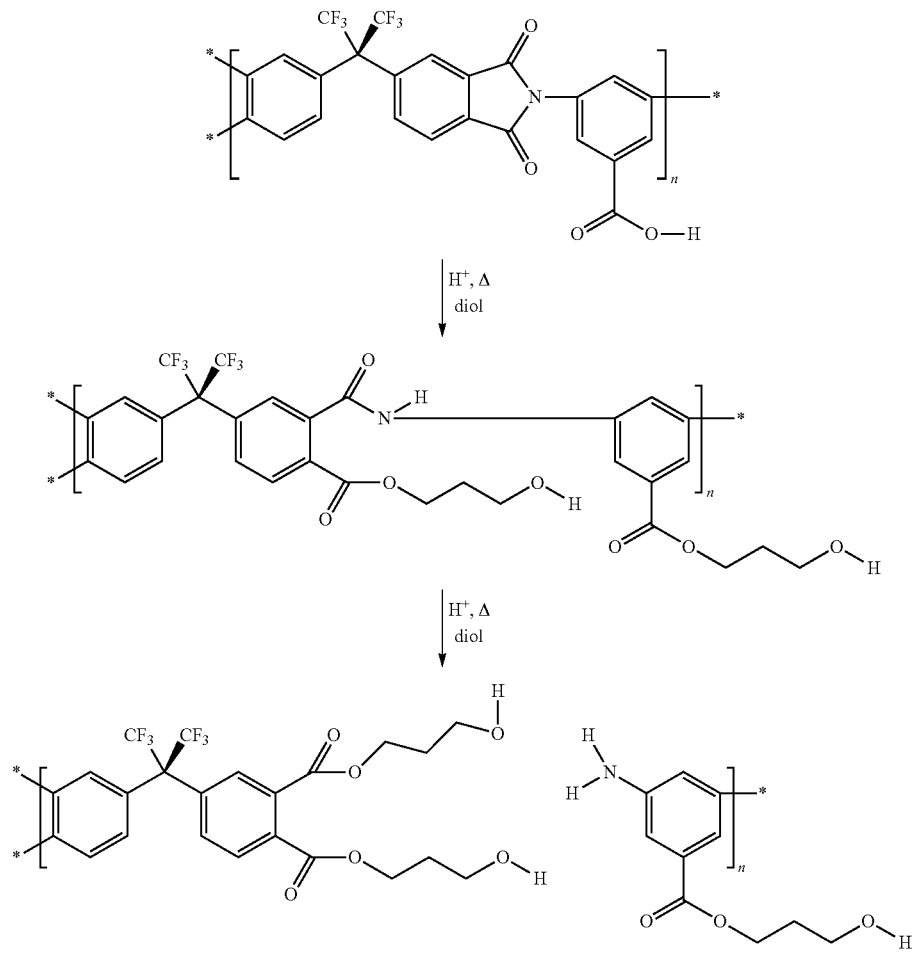

Figure 5:
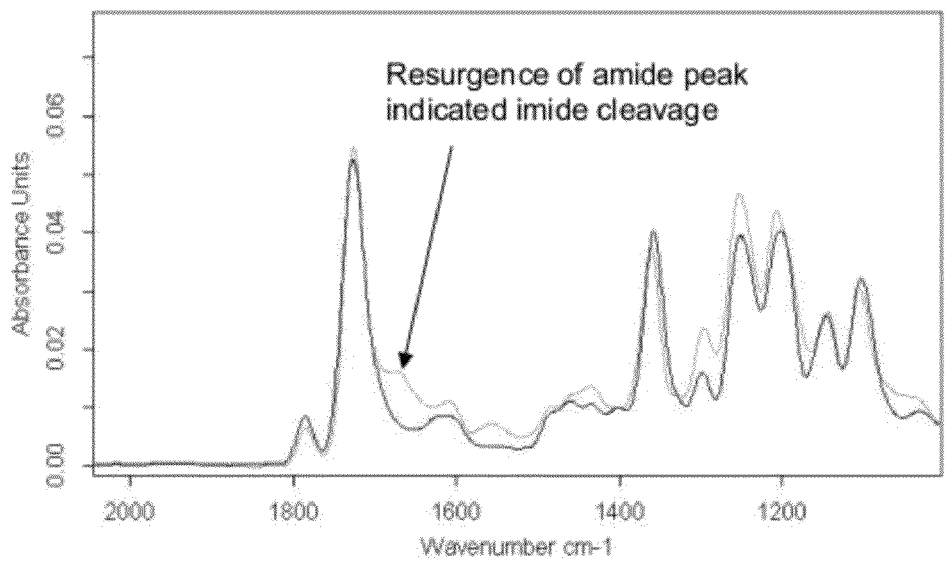
FIG. 5 shows an attenuated total reflection infrared (ATR-IR) spectrum of a low molecular weight, monoesterified polyimide polymer made according to a conventional monoesterification reaction.

To further investigate the presence of hydrolyzed imide rings, attenuated total reflection infrared (ATR-IR) spectroscopy was performed on the low molecular weight, monoesterified polyimide polymer to observe the presence of amic acid. The presence of amic acid can be observed by its amide group, which is located at 1660 cm$^{-1}$ on the ATR-IR spectrum. This peak was observed on the ATR-IR spectrum of the low molecular weight, monoesterified polyimide polymer shown in FIG. 5.

Figure 6:
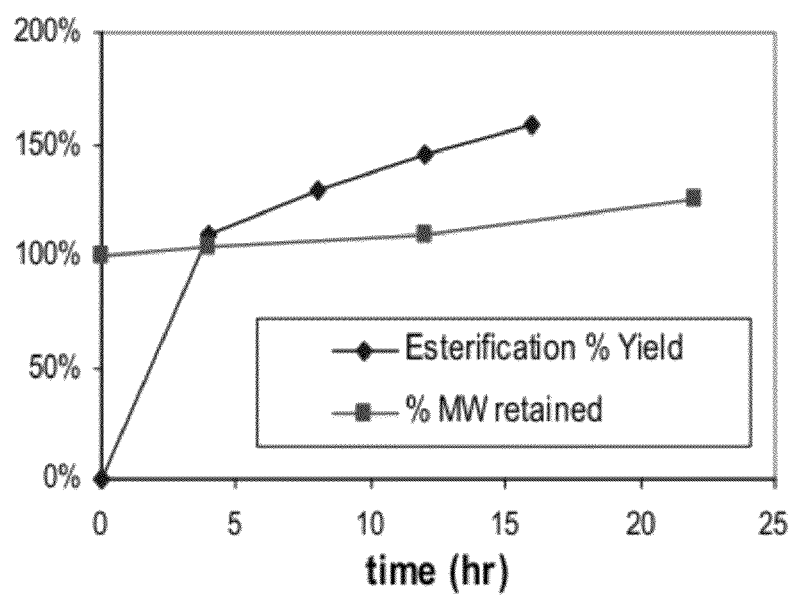
FIG. 6 shows a graph showing the effect of time on the molecular weight retention, as measured by Gel Permeation Chromatography (GPC), and ester yield of a high molecular weight, monoesterified polyimide polymer made according to the method as described herein.

The ester yields and molecular weight were monitored during the monoesterification reaction of Example 4, which included water removal and provided a high molecular weight, monoesterified polyimide polymer. FIG. 6 shows a graph of ester yield and molecular weight retention as a function of time for this monoesterification reaction.

Figure 7:
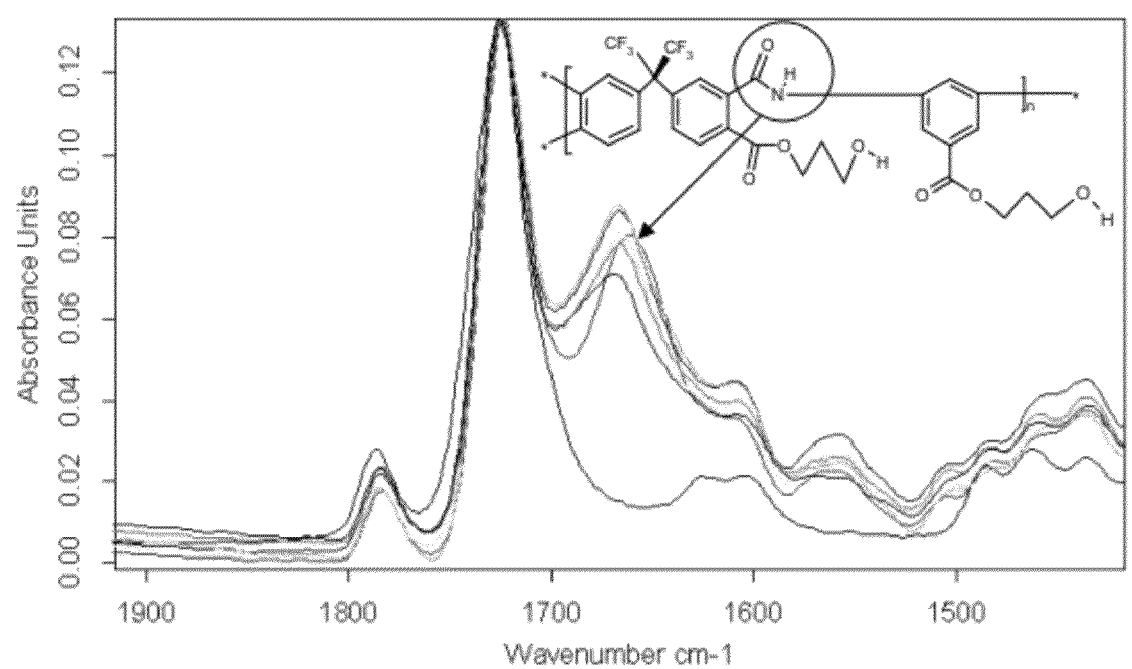
FIG. 7 shows an ATR-IR spectrum of the high molecular weight, monoesterified polyimide polymer prepared according to Example 4.

ATR-IR spectroscopy was performed on the high molecular weight, monoesterified polyimide polymer of Example 4. FIG. 7 shows the ATR-IR spectrum of the high molecular weight, monoesterified polyimide polymer of Example 4. This ATR-IR spectrum shows that there are still amides present, even to a higher extent than with the lower molecular weight monoesterified, polyimide polymer. This is further evidence that no scissioning has occurred, which would otherwise eliminate most of the amides.

The high molecular weight, monoesterified polyimide polymer of Example 4 was heated to 245° C. to crosslink. ATR-IR spectroscopy was performed on the crosslinked polymer. FIG. 8 shows the ATR-IR spectrum of the crosslinked polymer in comparison to the ATR-IR spectrum of the high molecular weight, monoesterified polyimide polymer of Example 4 and the ATR-IR spectrum of polyimide polymer of Example 4 prior to monoesterification. The ATR-IR spectrum suggests that during the transesterification reaction the opened imide rings may be recyclized.

Comparative Example 6

Take-Up Speed of Low Molecular Weight Monoesterified, Polyimide Polymers

In Wallace et al., *Journal of Membrane Science* 278 (2006) 92-104, low molecular weight monoesterified, polyimide polymers having an average molecular weight of about 30,000 as measured by GPC were spun into hollow fibers. The spinnability of the fibers made was compromised due to the low average molecular weight. The fibers could not be spun at take-up speeds greater than 37 m/min because the tension applied at high take-up speeds was significant.

Comparative Example 7

Take-Up Speed of Monoesterified, Polyimide Polymers

A spinning dope containing polyimide, NMP, ethanol, and a viscosity enhancing salt (LiNO$_3$) was mixed to form a homogeneous solution. The polyimide used was made from 6FDA and a 3:2 ratio of DAM to DABA. Over 98% of the DABA groups had been reacted with propane diol to form the monoester form of the polymer. The dope was rolled in a sealed container for 5 days to ensure complete mixing. The dope was then allowed to degas for 24 hours before being poured into an ISCO® syringe pump, where it was again degassed for 24 hours.

The dope was extruded from an annular spinneret at 0.8 mL/min through an air gap into a quench bath filled with deionized water and taken up on a rotating drum at between 14 and 16 m/min.

Example 8

Take-Up Speed of High Molecular Weight, Monoesterified Polyimide Polymers

6FDA, DAM, and DABA monomers were dissolved in NMP and left for about 24 hours to provide polyamide polymer. ODCB was added to the solution and the solution was heated for 26 hours at approximately 190° C. 2.5 mg para-toluene sulfonic acid per gram of polyimide polymer and 70 times the stoichiometric amount of 1,3 propanediol was added to the solution and the solution was heated for 22 hours at 130° C. A monoesterified, polyimide polymer having an average molecular weight of 105,000 as measured by GPC was precipitated form the solution. This polymer was spun into hollow fibers at take-up speeds up to 127 m/min, which was the maximum testable speed. The air gap was 15 cm and the spinning temperature was 50° C.

Example 9

Imidization with Intermittent Addition of Chemical Dehydrating Agent and Extended Period of Imidization 6FDA, DAM, and DABA monomers were dissolved in NMP and left for about 24 hours to provide a polyamide polymer. 2.5 ml ODCB per gram polyamide polymer was added intermittently to the solution while it was heated for approximately 24 hours at 190° C. About ⅓ of the ODCB was added at the beginning of the imidiziation reaction, about ⅓ of the ODCB was added after ⅓ of the imidization time elapsed, and the remaining ODCB was added after ⅔ of the imidization time elapsed. Water produced during the imidization was condensed and collected with a Dean-Stark trap.

A 12% increase in molecular weight of the polyimide polymer product was observed at the 18 hour point. The average molecular weight of the polyimide polymer product increased over time.

Example 10

Preparation of Spinning Dope

6FDA, DAM, and DABA monomers were dissolved in NMP and left for about 24 hours to provide polyamide polymer. ODCB was added to the solution and the solution was heated for 26 hours at approximately 190° C. A Dean-Stark trap was also used during imidization. 1,3 propanediol was added to the polyimide polymer solution and the solution was heated for 22 hours at 130° C. The Dean-Stark trap remained for monoesterification. A monoesterified, polyimide polymer having an average molecular weight of 183,500 as measured by GPC and a polydispersity index of 3.8 was precipitated from the solution.

The precipitation method was used to make a spinning dope containing the following components: monoesterified polyimide polymer, THF as the volatile component, lithium nitrate as the inorganic additive, NMP as the spinning solvent, and ethanol as the spinning non-solvent. First, the monoesterified polyimide polymer concentration was set at 35 weight percent, the THF concentration was set at 15 weight percent, the lithium nitrate concentration was set at 6.5 weight percent. Next, initial concentrations of NMP and ethanol were chosen in accordance with the precipitation method. The precipitation method was carried out until final concentrations of NMP and ethanol were obtained. The final concentration of NMP was 35 weight percent and the final concentration of ethanol was 8.5 weight percent.

A batch of spinning dope was prepared by first mixing NMP and ethanol in their final concentrations with 15 weight percent THF in a jar at least five times larger in volume than the total volume of the liquids. 6.5 weight percent lithium nitrate was dissolved in the liquids. The monoesterified polyimide polymer was added to the solution in at least three batches to provide the spinning dope. The solution was shaken after the addition of each batch. The jar was then placed on a roller and the spinning dope was mixed for at least two weeks.

Example 11

Spinning of Monoesterified Hollow Fiber

The spinning dope of Example 10 was used to spin monoesterified hollow fibers in a dry-jet/wet-quench spinning process. The spinning dope was heated to 70° C. The spinning dope was then extruded at an extrusion flow rate of about 120-180 ml/hr through a spinneret having orifices with an annular diameter of approximately 650 microns and a bore needle outer diameter of approximately 320 microns to provide hollow fibers. The face velocity of air surrounding the spinneret was 110 ft/min and the temperature on the outside of the spinneret was approximately 50° C. The hollow fibers were conveyed through an air gap of 33 cm and through a guide roll in a 50° C. de-ionized water bath. The water bath was 102 cm in height, 58 cm in length, and 16 cm in width and was heated prior to spinning by means of a water circulator with a heating element. The hollow fibers were subsequently wound around a take-up drum, which was rotating at a velocity of 50 m/min and partially contained in a vessel of room temperature de-ionized water in order to keep the fibers wet. The hollow fibers were left on the take-up drum for approximately 15 minutes and then cut into strands. The strands were left in another water bath for 2-3 days in order to remove the spinning solvent from the fiber. Next, the strands were immersed in two 30 min ethanol baths and then two 30 min hexane baths in order to dehydrate the fibers. Finally, they were air-dried for approximately two hours and placed in an approximately 70° C. vacuum oven for about 2 hours. The hollow fibers were imaged by scanning electron microscopy (SEM). The SEM images are provided as FIGS. 9A and 9B.

Example 12

Figure 3:
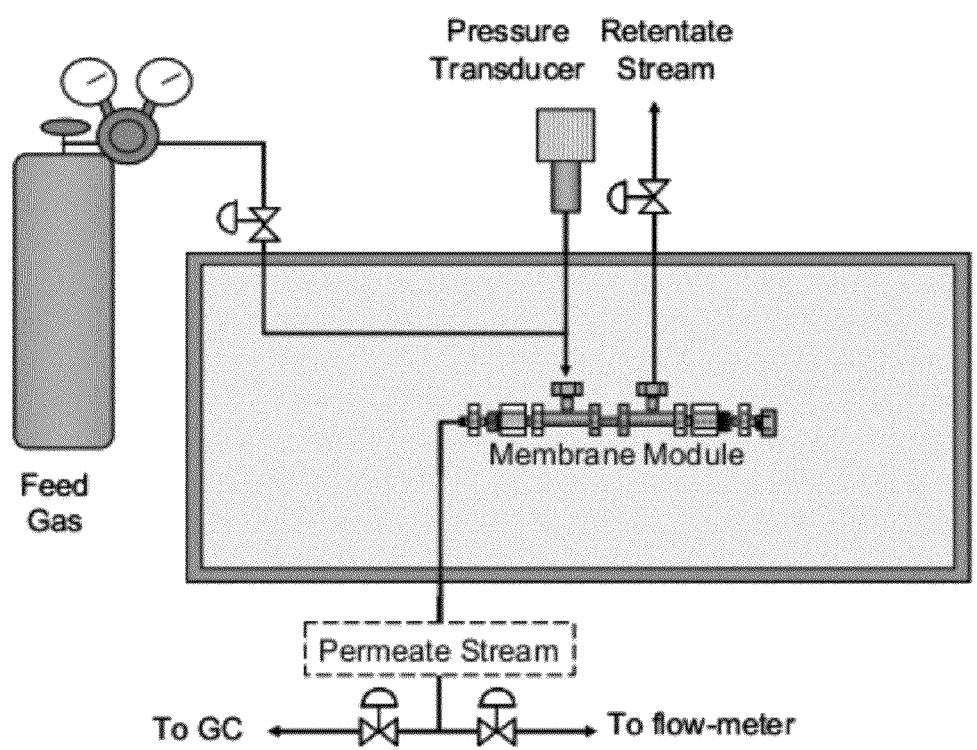
FIG. 3 is a schematic illustration of a test module used to test monoesterified hollow fibers made according to the method as described herein.

Testing of Monoesterified Hollow Fibers Made From High Molecular Weight Monoesterified, Polyimide Polymer The monoesterified hollow fibers of Example 11 were potted into three replicate test modules. Each test module contained a single fiber with an active length of approximately 20 cm. As shown in FIG. 3, each test module was fabricated from two stainless steel (316) Swagelok® ¼-inch tees 210, stainless steel ¼-inch tubing and nuts, two brass NPT ¼-inch female-tube adapters 215, two brass NPT ¼-inch male-tube adapters 220, and two brass Swagelok® ¼-inch nuts. The hollow fiber 205 was threaded through the module housing, so that a length of the hollow fiber extended on each end. The ends of the module were then plugged with 3M™ Scotch-Weld™ Epoxy Adhesive DP100 and cured overnight. The end of the fiber were snapped off after the epoxy adhesive hardened.

Gas transport through the hollow fibers was examined with a flow-meter testing system. The system permitted sampling of gas streams with a gas chromatograph. The testing module was attached in a shell feed method of operation. Mixed feed gas from a compressed gas cylinder was supplied on the shell-side of the test module. The test module was placed in a permeation box maintained at a constant temperature. The compositions of all the streams were determined by the gas chromatograph. Individual gas fluxes were then calculated.

Gases were fed on the shell side and permeation rate through the fibers was measured with a bubble-flow meter and a stop watch since the permeation rate is relatively high. Atmospheric pressure was maintained on the downstream side and the overall temperature was 35° C. The flux measured with the bubble flow meter was converted to permeance using fugacity coefficients from the virial equation-of-state, which corrects for the non-ideal gas phase thermodynamics occurring at high feed pressures. A stage cut (i.e. ratio of permeate flow rate to feed flow rate) of approximately 1% or less was used to minimize the effects of concentration polarization during testing and to maintain the upstream at constant composition, which simplifies the performance analysis. The selectivity was calculated by taking the ratio of the permeances.

With a 20/80 $CO_2/CH_4$ gas feed at 200 psig, the monoesterified hollow fibers had a selectivity of 30 and a $CO_2$ permeance of 206 GPU. A 50/50 $CO_2/CH_4$ gas feed was also tested at different pressures as shown in FIGS. 11C and 11D.

Example 13

Testing of Crosslinked Hollow Fibers Made From High Molecular Weight Monoesterified, Polyimide Polymer The monoesterified hollow fibers of Example 11 were heated under vacuum at 200° C. for approximately 2 hours and were left to cool under vacuum for approximately 6 hours to 50° C. The heating crosslinked the monoesterified polyimide polymer chains within the fibers. A single crosslinked fiber was then potted in a test module as described in Example 12 and tested in the system described in Example 12. With a 20/80 $CO_2/CH_4$ gas feed at 200 psig, the membrane had a selectivity of 41 and a $CO_2$ permeance of 58 GPU. A 20/80 $CO_2/CH_4$ gas feed was tested at different pressures as shown in FIGS. 10A and 10B. A 50/50 $CO_2/CH_4$ gas feed was also tested at different pressures as shown in FIGS. 11A and 11B. With pure gas feeds at 100 psig, the membrane had the selectivities and permeances set forth in Table 2.

TABLE 2

| | |
|---|---|
| $N_2$ permeance (GPU) | 1.86 |
| $O_2$ permeance (GPU) | 9.9 |
| He permeance (GPU) | 132 |
| $O_2/N_2$ selectivity | 5.3 |
| $He/N_2$ selectivity | 71 |

Comparative Example 14

Testing of Crosslinked Hollow Fibers Made from Low Molecular Weight Monoesterified, Polyimide Polymer In Example 8 of U.S. Pat. No. 6,932,859 (the '859 patent), which document is incorporated by reference in its entirety herein, fibers made in Example 7 of the '859 patent were potted into the same modules as those described in Example 12 and tested in the system described in Example 12. However, the overall temperature was 25° C. instead of 35° C. With a 20/80 $CO_2/CH_4$ gas feed at 50 psig, the fibers had a selectivity of 21 and a $CO_2$ permeance of 23 GPU. With pure gas feeds at 50 psig, the fibers had the selectivities and permeances set forth in Table 3.

TABLE 3

| | |
|---|---|
| $N_2$ permeance (GPU) | 1.7 |
| $O_2$ permeance (GPU) | 6.5 |
| He permeance (GPU) | 52 |
| $O_2/N_2$ selectivity | 3.8 |
| He/$N_2$ selectivity | 31 |

Comparative Example 15

Testing of Crosslinked Hollow Fibers Made from Low Molecular Weight Monoesterified, Polyimide Polymer In D. Wallace, *Crosslinked Hollow Fiber Membranes for Natural Gas Purification and their Manufacture from Novel Polymers*, Ph.D. Dissertation, University of Texas, August 2004, hollow fibers made from the same polyimide polymer used in Example 7 of the '859 patent, with the exception that the polymer only had an average molecular weight of 29,000, were tested. Such dissertation is incorporated by reference in its entirety herein. With 20/80 $CO_2/CH_4$ gas feed at 200 psig and an overall temperature of 30° C., the fibers had a selectivity of 32 and a $CO_2$ permeance of 35 GPU.

Although the methods as described herein has been described in connection with certain embodiments thereof, it will be appreciated by those skilled in the art that additions, deletions, modifications, and substitutions not specifically described may be made without departing from the spirit and scope of the methods as defined in the appended claims.

That which is claimed is:
1. A method of making a crosslinked membrane, comprising:
  (a) preparing a polyimide polymer comprising carboxylic acid functional groups from a reaction solution comprising monomers and at least one solvent, with the preparation of the polyimide polymer taking place under dehydrating conditions such that the concentration of water in the reaction solution is maintained at between about 0 weight percent and 0.26 weight percent;
  (b) treating the polyimide polymer with a diol at esterification conditions in the presence of dehydrating conditions to form a monoesterified polyimide polymer, with the dehydrating conditions at least partially removing water produced during step (b); and
  (c) subjecting the monoesterified polyimide polymer to transesterification conditions to form a crosslinked membrane.
2. The method of claim 1, wherein the crosslinked membrane is a crosslinked hollow fiber membrane and the method further comprises forming monesterified fiber from the monesterified polyimide polymer and subjecting the monesterified fiber to transesterification conditions to form a crosslinked hollow fiber membrane.
3. The method of claim 1, wherein the dehydrating conditions of step (b) are a chemical dehydrating agent.
4. The method of claim 3, wherein the chemical dehydrating agent is an azeotropic chemical dehydrating agent or a carbodiimide.
5. The method of claim 4, wherein the azeotropic chemical dehydrating agent is selected from the group consisting of orthodichlorobenzene (ODCB), benzene, toluene, and mixtures thereof.
6. The method of claim 1, wherein the dehydrating conditions of step (b) are a mechanical dehydrating agent.
7. The method of claim 6, wherein the mechanical dehydrating agent is a Dean-Stark trap.
8. The method of claim 1, wherein the dehydrating conditions of step (b) comprise a chemical dehydrating agent and a mechanical dehydrating agent.
9. The method of claim 1, wherein the dehydrating conditions of step (a) are a chemical dehydrating agent.
10. The method of claim 9, wherein the chemical dehydrating agent is an azeotropic chemical dehydrating agent or a carbodiimide.
11. The method of claim 10, wherein the azeotropic chemical dehydrating agent is selected from the group consisting of orthodichlorobenzene (ODCB), benzene, toluene, and mixtures thereof.
12. The method of claim 1, wherein the dehydrating conditions of step (a) are a mechanical dehydrating agent.
13. The method of claim 12, wherein the mechanical dehydrating agent is a Dean-Stark trap.
14. The method of claim 1, wherein the dehydrating conditions of step (a) comprise a chemical dehydrating agent and a mechanical dehydrating agent.
15. The method of claim 2, wherein the forming step comprises spinning the monoesterified hollow fiber from a spinning dope comprising the monoesterified polyimide polymer, a volatile component, a spinning solvent, a spinning non-solvent, and optionally an inorganic additive.
16. The method of claim 15, wherein the monoesterified polyimide polymer is present in the spinning dope in an amount between about 20 and about 50 weight percent.
17. The method of claim 15, wherein the volatile component is present in the spinning dope in an amount between about 5 and about 25 weight percent.
18. The method of claim 15, wherein the inorganic additive is an antilyotropic salt.
19. The method of claim 15, wherein the volatile component is an organic solvent having a room temperature vapor pressure greater than about 0.05 bar and a normal boiling point between about 30° C. and about 100° C.
20. The method of claim 19, wherein the volatile component is selected from the group consisting of tetrahydrofuran (THF), acetone, and mixtures thereof.
21. The method of claim 18, wherein the antilyotropic salt is present in the spinning dope in an amount between about 0 and about 10 weight percent.
22. The method of claim 15, wherein the spinning solvent is an organic solvent selected from the group consisting of N-methyl-2-pyrrolidone (NMP), dimethyl sulfoxide (DMSO), dimethylformamide (DMF), dimethylacetamide (DMAc), and diglyme.
23. The method of claim 15, wherein the spinning non-solvent is selected from the group consisting of an aliphatic alcohol, water, and mixtures thereof.
24. The method of claim 15, wherein the concentrations of the spinning solvent and the spinning non-solvent in the spin ning dope are determined by a precipitation method, the precipitation method comprising:
- (i) setting the concentrations of the monoesterified polyimide polymer, the volatile component, and the optional inorganic additive;
- (ii) choosing initial concentrations of the spinning solvent and the spinning non-solvent;
- (iii) combining the monoesterified polyimide polymer, the volatile component, the optional inorganic additive, the spinning solvent, and the spinning non-solvent to provide a spinning dope sample;
- (iv) if the polymer precipitates out, increasing the concentration of the spinning solvent between about 0 weight percent and about 5 weight percent to arrive at a final spinning solvent concentration and similarly decreasing the concentration of the spinning non-solvent to arrive at a final spinning non-solvent concentration; and
- (v) if the polymer does not precipitate out, altering the initial concentrations of the spinning solvent and/or the spinning non-solvent and repeating steps (iii)-(v) until the spinning dope sample is a homogeneous single phase.

25. The method of claim 15, wherein the monoesterified hollow fiber is spun from the spinning dope by a dry-jet/wet-quench spinning process comprising:
- (a) extruding the monoesterified polyimide polymer through orifices of a spinneret to provide a monoesterified hollow fiber;
- (b) conveying the monoesterified hollow fiber through an air gap and through a coagulating bath of de-ionized water; and
- (c) winding the monoesterified hollow fiber around a take-up drum at a take-up rate between about 10 m/min and about 150 m/min, wherein the dry-jet/wet-quench spinning process has a draw ratio of less than 150.

26. The method of claim 25, wherein the temperature of the spinning dope is greater than 40° C.

27. The method of claim 25, wherein the temperature of the coagulating bath is between about 10° C. and about 70° C.

28. The method of claim 25, wherein the dry-jet/wet-quench spinning process has an air gap height that is greater than 5 centimeters.

29. The method of claim 25, wherein the dry-jet/wet-quench spinning process has a face velocity of air surrounding the spinneret that is greater than 50 feet per minute.

30. A method of using the crosslinked membrane made according to the method of claim 1, comprising:
- (a) providing a feed stream selected from the group consisting of air, a mixture of methane and nitrogen, a mixture of methane and hydrogen, a mixture of methane and hydrogen sulfide, a refinery stream, a mixture of carbon dioxide and methane, and syngas, the feed stream including a gaseous component selected from the group consisting of nitrogen, oxygen, hydrogen, hydrogen sulfide and carbon dioxide;
- (b) maintaining a pressure differential between an upstream side of the membrane and a downstream side of the membrane;
- (c) contacting the upstream side of the membrane with the feed stream at a pressure between about 20 psia and about 4000 psia;
- (d) isolating a permeate stream on the downstream side of the membrane having a larger mole fraction of the faster permeating component of the feed stream; and
- (e) isolating a retentate stream having a smaller mole fraction of the faster permeating component of the feed stream.

31. The method of claim 30, wherein the crosslinked membrane is a crosslinked hollow fiber membrane.

* * * * *

UNITED STATES PATENT AND TRADEMARK OFFICE
CERTIFICATE OF CORRECTION

PATENT NO.       : 8,328,906 B2
APPLICATION NO.  : 13/305350
DATED            : December 11, 2012
INVENTOR(S)      : Stephen J. Miller et al.

It is certified that error appears in the above-identified patent and that said Letters Patent is hereby corrected as shown below:

On the title page item (75), the name of the third inventor is incorrectly spelled "Kronos" and should be corrected as follows -- Koros --.

In column 35, lines 62 through 63, each of three occurrences of the word "monesterified" should be corrected to read -- monoesterified --.

Signed and Sealed this
Ninth Day of April, 2013

Teresa Stanek Rea
*Acting Director of the United States Patent and Trademark Office*